United States Patent [19]

Akasaka et al.

[11] Patent Number: 6,049,843
[45] Date of Patent: Apr. 11, 2000

[54] SYSTEM FOR DATA COMMUNICATION BETWEEN DISK ADAPTER AND DISK CARTRIDGE DRIVE WHERE ADAPTER CONTROLLER ASSIGNS SPECIFIC TRACK TO FORMATTED DATA TO BE SENT TO DRIVE

[75] Inventors: Nobuhiko Akasaka; Shigeru Hashimoto; Tsuyoshi Niwata; Koken Yamamoto, all of Kawasaki, Japan

[73] Assignee: Fujitsu Limited, Kawasaki, Japan

[21] Appl. No.: 09/059,574

[22] Filed: Apr. 14, 1998

[30] Foreign Application Priority Data

Nov. 4, 1997 [JP] Japan ............................... 9-302009

[51] Int. Cl.⁷ ............................................ G06F 13/12
[52] U.S. Cl. .............................. 710/74; 235/492; 710/8; 710/14; 710/33; 710/62; 710/65; 710/129
[58] Field of Search ...................... 235/492; 360/77.04, 360/77.07, 77.08, 121; 369/44.42; 710/74, 102, 8, 14, 33, 62, 65, 129; 711/5, 133

[56] References Cited

U.S. PATENT DOCUMENTS

| | | | |
|---|---|---|---|
| 4,396,959 | 8/1983 | Harrison et al. | 360/77.08 |
| 4,414,658 | 11/1983 | Yoshida | 369/44.42 |
| 4,633,345 | 12/1986 | Keener | 360/77.07 |
| 4,660,106 | 4/1987 | Harrison et al. | 360/77.08 |
| 4,805,090 | 2/1989 | Coogan | 710/74 |
| 4,819,095 | 4/1989 | Asano et al. | 360/77.04 |
| 5,159,182 | 10/1992 | Eisele | 235/492 |
| 5,338,923 | 8/1994 | Grieu | 235/492 |
| 5,457,590 | 10/1995 | Barrett et al. | 360/133 |
| 5,471,038 | 11/1995 | Eisele et al. | 235/380 |
| 5,584,043 | 12/1996 | Burkart | 710/62 |
| 5,594,885 | 1/1997 | Lautzenheiser | 711/133 |
| 5,663,553 | 9/1997 | Aucsmith | 235/492 |
| 5,703,739 | 12/1997 | Hayakawa et al. | 360/121 |
| 5,802,544 | 9/1998 | Combs et al. | 711/5 |
| 5,887,145 | 3/1999 | Harari et al. | 710/102 |
| 5,936,226 | 8/1999 | Aucsmith | 235/492 |

*Primary Examiner*—Thomas C. Lee
*Assistant Examiner*—Chien Yuan
*Attorney, Agent, or Firm*—Armstrong, Westerman, Hattori, McLeland & Naughton

[57] ABSTRACT

A method of communication between an adapter and a drive improves the data processing efficiency of the adapter and data transfer efficiency between the adapter and the drive.

The drive has a slot to receive a disk cartridge containing a disk and drives the cartridge. The adapter is shaped to be inserted into the slot of the drive. The adapter has a controller to transfer data between the adapter and the drive through the heads thereof. The controller formats data so that the formatted data may fit into at least part of a disk format having tracks and sectors handled by the drive. The controller assigns a specific one of the tracks to the formatted data and transmits the track with the data to the drive.

10 Claims, 22 Drawing Sheets

Fig. 20

EXAMPLE OF SECTOR 2

| | | |
|---|---|---|
| Sync | 00×12 | ⎫ |
| ID ADDRESS MARK | A1×3<br>FE×1 | |
| ID | 00×1<br>00×1<br>02×1<br>02×1 | ID FIELD |
| CRC | CRC×2 | ⎭ |
| GAP 2 | 4E×22 | |
| Sync | 00×12 | ⎫ |
| DATA MARK | A1×3<br>FB×1 | |
| DATA OF 512 BYTES IN TOTAL | HEADER | |
| | STATUS DATA | DATA FIELD |
| | Sum×2 | |
| CRC | CRC×2 | ⎭ |
| GAP 3 | 4E×84 | |

…

SYSTEM FOR DATA COMMUNICATION BETWEEN DISK ADAPTER AND DISK CARTRIDGE DRIVE WHERE ADAPTER CONTROLLER ASSIGNS SPECIFIC TRACK TO FORMATTED DATA TO BE SENT TO DRIVE

BACKGROUND OF THE INVENTION

1. Field of the Invention

The present invention relates to an adapter and a method of communication between the adapter and a disk cartridge drive. In particular, the present invention relates to a disk-cartridge-type adapter having the same shape as a 3.5-inch floppy disk (FPD) cartridge, for accommodating an IC card or a semiconductor memory for storing, for example, electronic money information. The adapter is inserted into a disk cartridge drive such as a 3.5-inch floppy disk drive (FDD) and is driven thereby. The present invention also relates to a method of communication between the adapter and the FDD.

2. Description of the Related Art

Disk-cartridge-type adapters are disclosed in, for example, a Japanese Unexamined Patent Publication (Kohyo) No. 6-509194 corresponding to U.S. Pat. No. 5,584,043, and a Japanese Examined Patent Publication (Kokoku) No. 7-86912 corresponding to U.S. Pat. No. 5,159,182. FIG. 1 is a block diagram showing one of the adapters disclosed therein. The adapter 1a has the same shape as a 3.5-inch FPD cartridge and incorporates a semi-conductor memory 2a for storing, for example, electronic money data, a magnetic head 3, an opening 4 for making the head 3 face a magnetic head of an FDD (not shown), and a battery 5a for supplying power to the memory 2a.

The memory 2a employs the same data format as FPDs. The adapter 1a is inserted into the FDD so that data is transferred between the memory 2a and a data processor such as a personal computer through the FDD.

FIG. 2 is a block diagram showing another adapter disclosed in the publications. The adapter 1b has the same shape as the 3.5-inch FPD cartridge and incorporates an IC card 2b for storing, for example, electronic money data, a microprocessor (MPU) 6, a magnetic head 3, an opening 4 for making the head 3 face a magnetic head of an FDD, and a battery (or a generator) 5b for supplying power to the IC card 2b and MPU 6.

The adapter 1b is inserted into the FDD so that data is transferred between the IC card 2b and a data processor such as a personal computer through the FDD and head 3. The MPU 6 converts data from the data processor into data to be written into the IC card 2b, and data from the IC card 2b into data to be transferred to the data processor.

Although the prior arts describe a communication interface between the adapters and FDDs, they describe nothing about data formats transferred between the adapters and FDDs. It is understood that the adapters of the prior arts employ the same data format as that employed by FPDs. The FPD data format involves many tracks in a radial direction and many (for example, nine) sectors in a circumferential direction. If all of these tracks and sectors are used for the adapters, an FDD's seek time, an adapter's data processing time, and a data transfer time between the FDD and the adapter will be excessively long.

SUMMARY OF THE INVENTION

An object of the present invention is to improve the data processing efficiency of a disk-cartridge-type adapter.

Another object of the present invention is to improve data transfer efficiency between a disk-cartridge-type adapter and a disk cartridge drive.

In order to accomplish the objects, a first aspect of the present invention provides an adapter having a controller for controlling data transfer between the adapter and a disk cartridge drive. The controller formats data to be sent to the disk cartridge drive so that the formatted data may fit into at least part of a disk format having tracks and sectors handled by the disk cartridge drive, and assigns a specific one of the tracks to the formatted data.

A second aspect of the present invention makes the controller assign a specific one of the sectors to the formatted data.

A third aspect of the present invention makes the controller assign a specific one of the sectors to data that informs the disk cartridge drive of an access from the adapter.

A fourth aspect of the present invention makes the controller assign a specific one of the sectors to data to be transferred from the adapter to the disk cartridge drive.

A fifth aspect of the present invention makes the controller assign a specific one of the sectors to data transferred from the disk cartridge drive to the adapter.

A sixth aspect of the present invention makes the controller change the duration of a gap between adjacent sectors according to data transfer conditions.

A seventh aspect of the present invention makes the controller change the duration of the specific track according to data transfer conditions.

An eighth aspect of the present invention makes the controller change the duration of the specific track by changing the frequency dividing ratio of a reference clock signal.

A ninth aspect of the present invention provides an adapter having a first communication interface between the adapter and a disk cartridge drive, a controller for controlling the first communication interface, and a data transfer unit provided for the first communication interface, for transferring preset data to the disk cartridge drive when the controller is unavailable to control the first communication interface.

A tenth aspect of the present invention makes the preset data rewritable by software that controls the adapter.

An eleventh aspect of the present invention arranges a second communication interface between the adapter and a storage medium incorporated in the adapter. The data transfer unit transfers the preset data to the disk cartridge drive while the controller is exclusively controlling the second communication interface.

A twelfth aspect of the present invention provides the data transfer unit with a counter for counting index pulses generated at intervals of the duration of the specific track, a data pattern unit for storing data patterns and corresponding counts to be counted by the counter, and a data selector for selecting one of the output of the controller and the output of the data pattern unit according to the status of the controller.

A thirteenth aspect of the present invention makes the first communication interface transfer data at specific intervals and makes the data selector select one of the outputs at the specific intervals.

A fourteenth aspect of the present invention makes the controller send the same data in the next cycle if the controller receives no response from the first communication interface to a data transmission instruction.

A fifteenth aspect of the present invention makes the data transfer unit continuously send the preset data for each cycle in which the controller is unavailable to control the first communication interface.

A sixteenth aspect of the present invention makes the controller assign a specific sector for data to be transferred from the adapter to the disk cartridge drive and makes the data transfer unit transfer the preset data with the specific sector.

A seventeenth aspect of the present invention provides a method of communication between an adapter and a disk cartridge drive. The disk cartridge drive has a slot to receive and drive a disk cartridge that incorporates a disk. The adapter is so shaped to be inserted into the slot of the disk cartridge drive. The method fixedly positions a head of the disk cartridge drive with respect to a head of the adapter and transfers data between them in a format that is identical to at least part of a disk format having tracks and sectors handled by the disk cartridge drive. The method assigns a specific one of the tracks to data and transfers the data between the heads of the adapter and disk cartridge drive.

An eighteenth aspect of the present invention makes the method assign a specific one of the sectors to data and transfer the data with the specific sector between the heads of the adapter and disk cartridge drive.

The first to eighteenth aspects of the present invention shorten a data transfer time. These aspects make the data transfer unit send the preset data if the controller is unavailable to control the first communication interface, thereby making the controller exclusively carry out necessary operations.

BRIEF DESCRIPTION OF THE DRAWINGS

FIG. 20 shows the structure of a sector 2 according to still another embodiment of the present invention;

DESCRIPTION OF THE PREFERRED EMBODIMENTS

Figure 1:
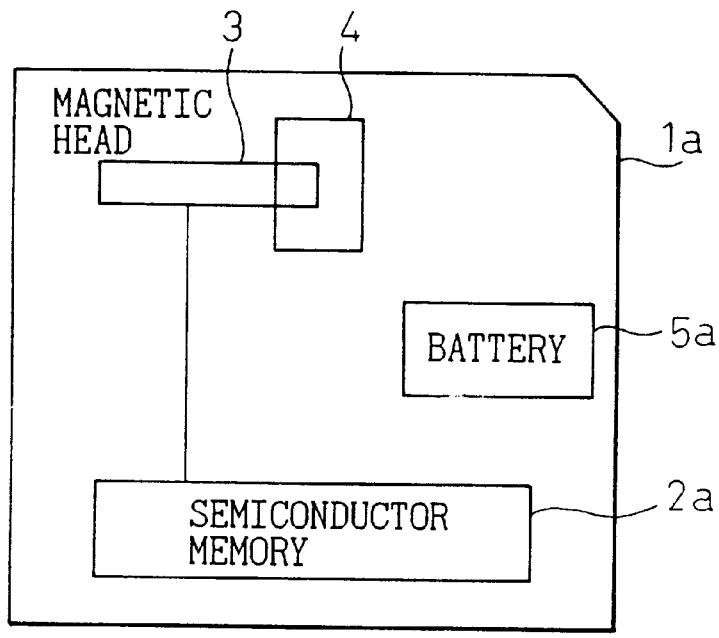
FIG. 1 is a block diagram showing a disk-cartridge-type adapter according to a prior art.
Figure 2:
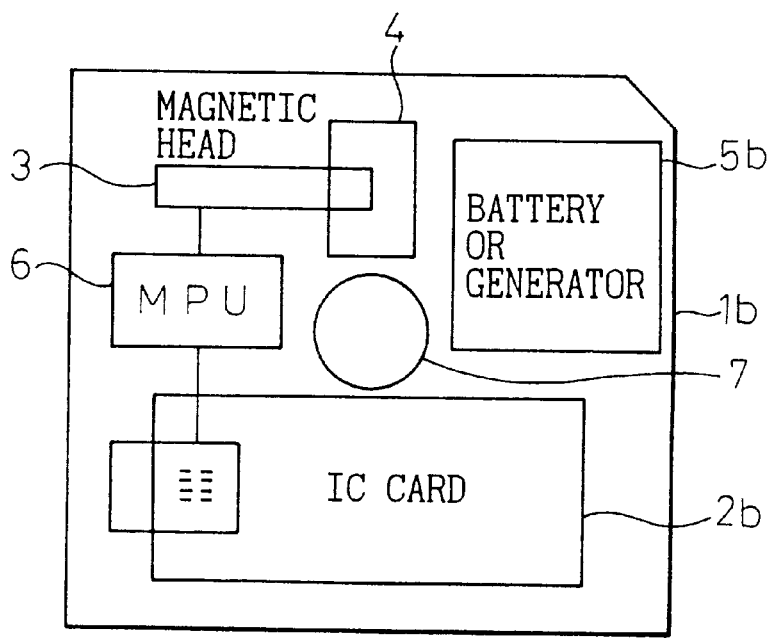
FIG. 2 is a block diagram showing a disk-cartridge-type adapter according to another prior art.

In the following explanation, each disk-cartridge-type adapter has the same shape as a 3.5-inch FPD cartridge, and a disk cartridge drive is an FDD for driving the 3.5-inch FPD cartridge. The present invention, however, is not limited to them. The present invention is applicable to any cartridge that has a head for sending and receiving data by magnetic coupling, and to any disk cartridge drive or portable file drive that has a head for sending and receiving data by magnetic coupling. Like reference numerals represent like parts through the drawings.

To clarify the basics of the present invention, a relationship between an adapter and an FDD will be explained with reference to FIGS. 3 to 8.

The adapter 1 has the same shape as the 3.5-inch FPD cartridge. The FDD 31 is connected to a data processor 32 such as a personal computer. The shape of the 3.5-inch FPD cartridge is based on international standards. Although the adapter 1 is rectangular in FIGS. 3 and 4, it is substantially square like a 3.5-inch FPD cartridge. The adapter 1 is inserted into the FDD 31 and transfers data between them by magnetic coupling through interfaces thereof. Data transfer between the FDD 31 and the data processor 32 is carried out as in a standard computer system.

Figure 4:
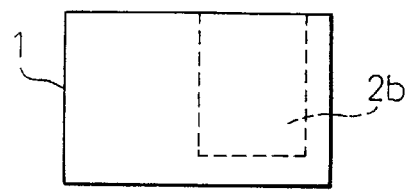
FIG. 4 is a plan view showing the adapter of FIG. 3 with a card unit such as an IC card inserted therein.

FIG. 4 is a plan view showing the adapter 1 with a card unit 2b such as an IC card inserted therein. Instead of the card unit 2b, the adapter 1 may incorporate a semiconductor memory.

Figure 5:
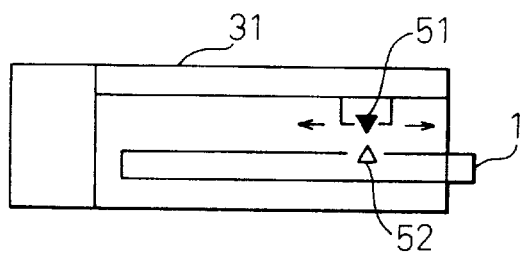
FIG. 5 is a sectional view showing the adapter and FDD of FIG. 3.

FIG. 5 is a sectional view showing the FDD 31 with the adapter 1 inserted therein. The FDD 31 has a magnetic head 51 for transferring data by magnetic coupling. The adapter 1 has a magnetic head 52 for transferring data by magnetic coupling. When the adapter 1 is completely inserted in the FDD 31, the heads 51 and 52 face each other, to start data transfer between them by magnetic coupling.

If a standard FPD cartridge is in the FDD 31, the head 51 of the FDD 31 moves in a direction, indicated by arrow marks in FIG. 5, to carry out a seek operation to access an FPD contained in the FPD cartridge. The adapter 1 of the present invention contains no magnetic disk, and the head 52 thereof transfers data in a format that is identical to at least part of a format of the FPD. Accordingly, if the adapter 1 is in the FDD 31, the head 51 of the FDD 31 is fixed to face and access the head 52 of the adapter 1.

Figure 6:
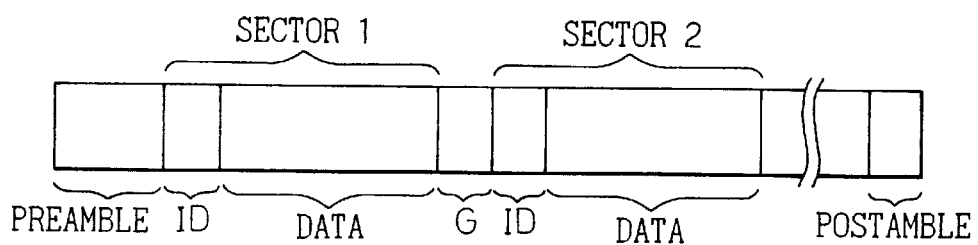
FIG. 6 shows an example of a data format handled by the adapter of the present invention.

FIG. 6 shows an example of a data format handled by the adapter 1. The adapter 1 of the present invention emulates the FPD when transferring data. Accordingly, the format of FIG. 6 is identical to at least part of the format of the FPD. In the case of the FPD, data in sectors 1 to 9 is transferred between the FPD and the FDD 31 in the period of, for example, 200 ms during which the FPD turns once. The data format consists of sectors and tracks and includes a preamble before the sector 1 and a postamble after the sector 9. A gap G is present between adjacent sectors. Each sector consists of a sector ID and data.

To receive data from the FDD 31, the adapter 1 of the present invention sends a preamble and a sector ID to the FDD 31 and then receives the data from the FDD 31.

To transmit data to the FDD 31, the adapter 1 sends a preamble and a sector ID to the FDD 31 and then transmits the data to the FDD 31.

Figure 7:
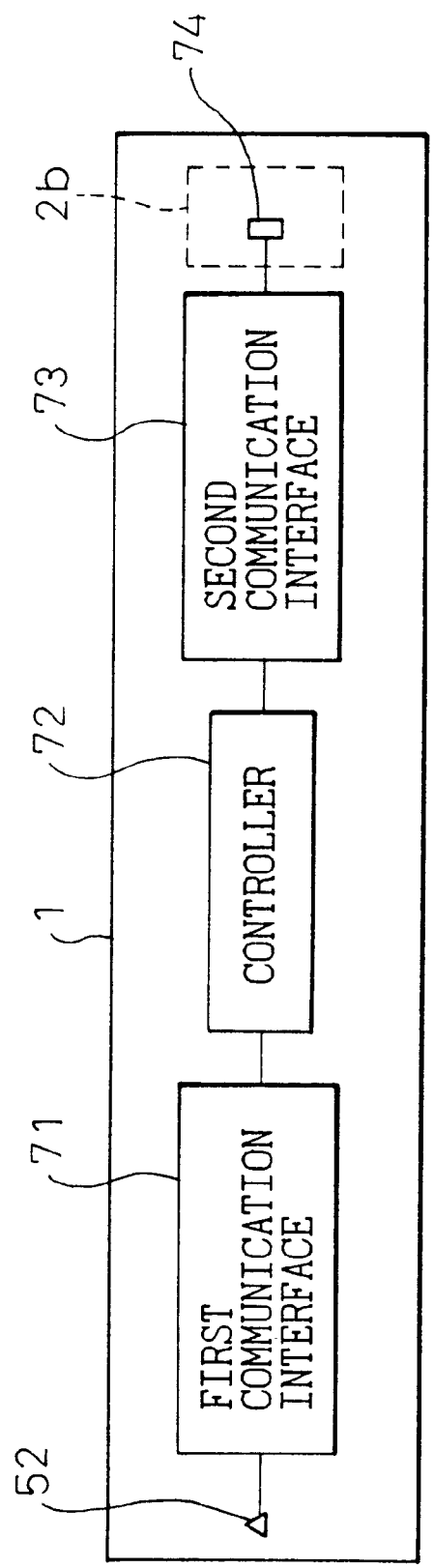
FIG. 7 is a block diagram showing the structure of the adapter of FIG. 3.

FIG. 7 is a block diagram showing the structure of the adapter 1 of the present invention. The IC card 2b in the adapter 1 stores various kinds of information such as money information. The adapter 1 has a first communication interface 71 for communicating with the FDD 31, a controller 72, and a second communication interface 73 for communicating with the IC card 2b.

To communicate with the FDD 31, the controller 72 sends and receives data to and from the first interface. 71. To communicate with the IC card 2b, the controller 72 sends and receives data to and from the second interface 73.

If data received from the FDD 31 requires an access to the IC card 2b, the controller 72 must exclusively communicate with the IC card 2b thereafter.

In this case, the controller 72 notifies the first interface 71 that controller 72 is unavailable to control the first interface 71. Upon receiving this notice, the first interface 71 sends preset data to the FDD 31, as will be explained in detail.

Figure 8:
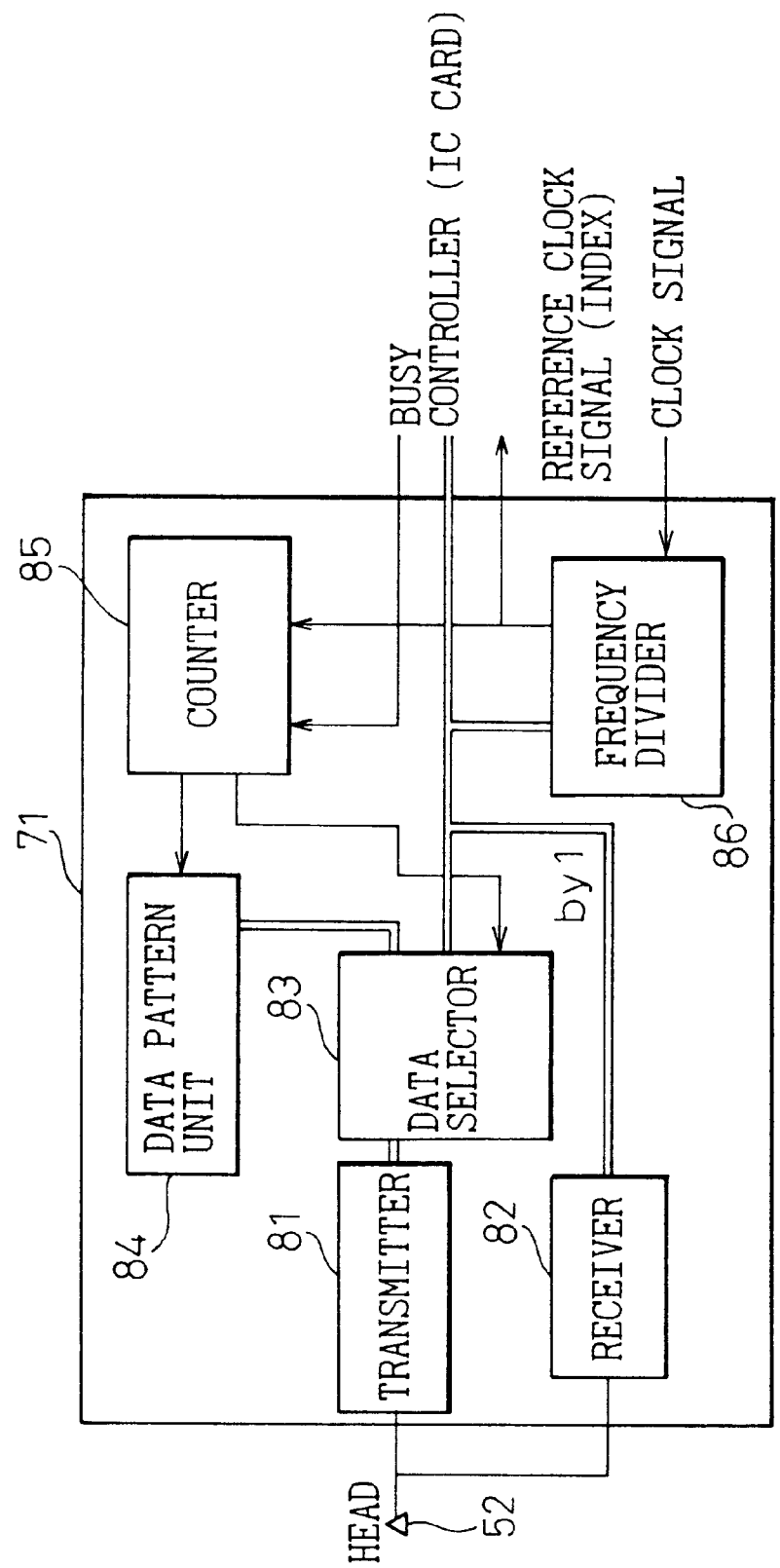
FIG. 8 is a block diagram showing a first communication interface of the adapter of FIG. 7.

FIG. 8 is a block diagram showing the structure of the first interface 71. The first interface 71 has a transmitter 81, a receiver 82, a data selector 83, a data pattern unit 84, a counter 85, and a frequency divider 86.

The frequency divider 86 divides the frequency of an external clock signal and generates a reference clock pulse (an index pulse). The index pulse indicates the start of a track. In this embodiment, the index pulse is generated at fixed intervals of, for example, 200 ms corresponding to the duration of a track on the FPD.

The operation of the first interface 71 of FIG. 8 will be explained later with reference to flowcharts.

Figure 9:
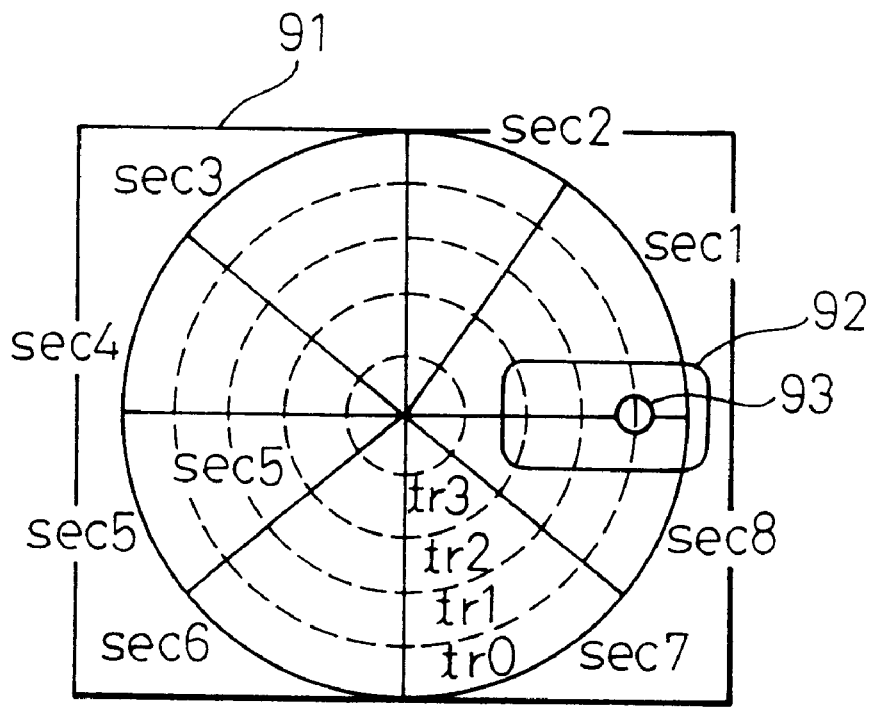
FIG. 9 shows the format of a standard floppy disk (FPD)

FIG. 9 shows the structure of the standard FPD stored in an FPD cartridge. The FPD is divided by concentric circles into tracks 00, 01, and the like. Although the figure shows only tracks 0 to 3, the FPD actually has many tracks. The tracks are divided into sectors 1, 2, and the like. Although the figure shows only sectors 1 to 8, the FPD has actually nine or more sectors.

The FPD cartridge has a window 92 in which a head 93 (corresponding to the head 51 of FIG. 5) of an FDD is positioned to magnetically read and write data to and from the FPD.

If the head 93 is on the track 00 and if it must read data on the track 01, the head 93 is moved toward the center of the FPD. If the necessary data is in the sector 1 on the track 01, the FPD is turned so that the sector 1 is positioned under the head 93.

The adapter 1 of the present invention employs no disk, and the controller 72 of the adapter 1 transfers data in the format of FIG. 6. To achieve this, the present invention assigns a specific track, for example, the track 00 to data to be handled by the controller 72 (claim 1).

Figure 3:
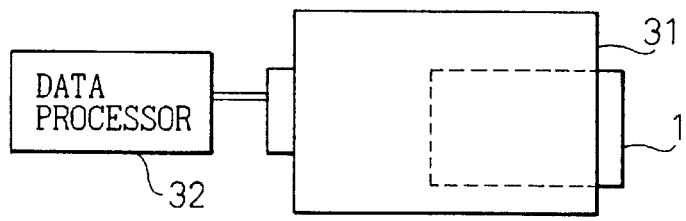
FIG. 3 shows an adapter, an FDD, and a data processor, based on the present invention.
Figure 10:
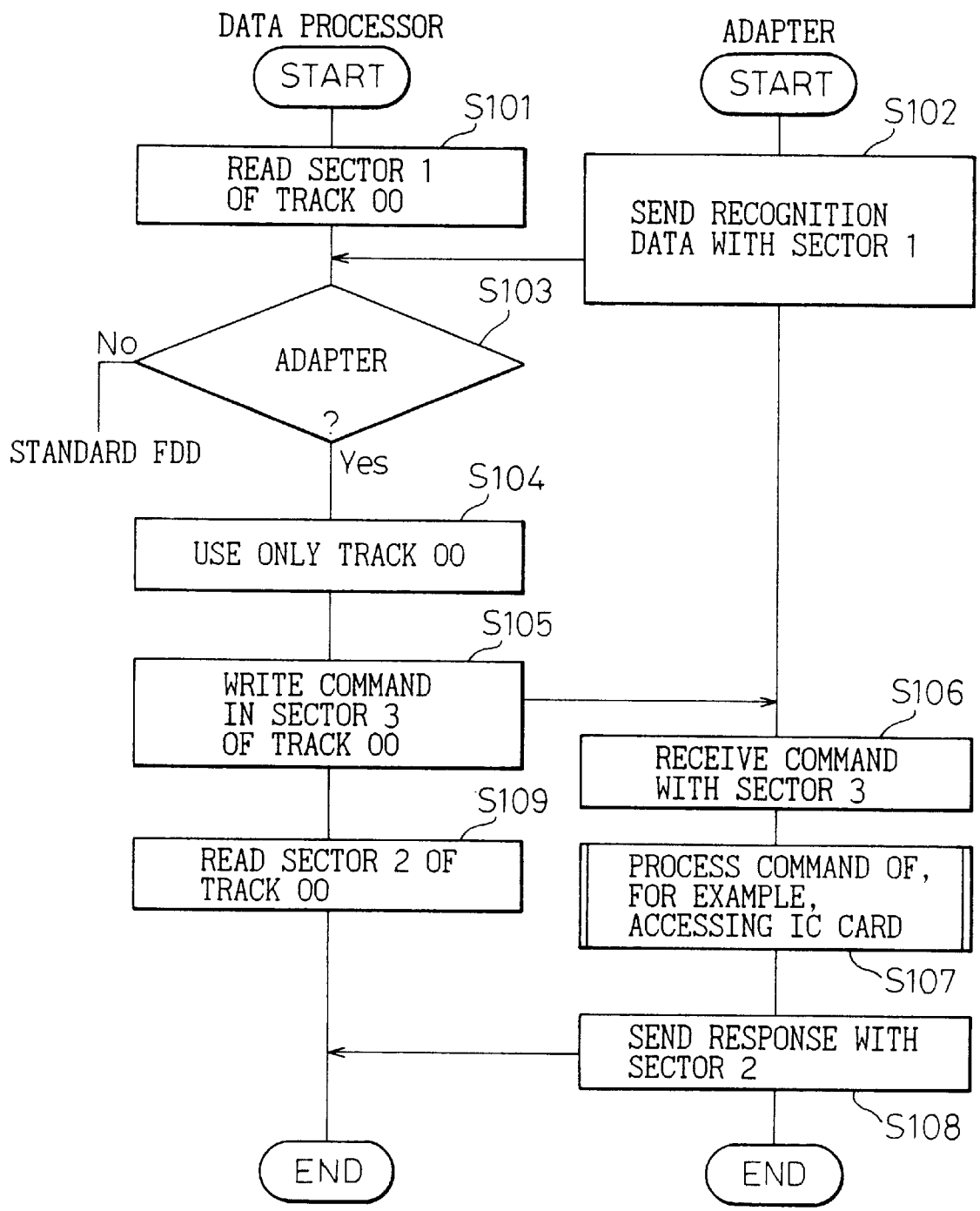
FIG. 10 is a flowchart showing a method of communication between the data processor and adapter of FIG. 3, according to an embodiment of the present invention.

FIG. 10 is a flowchart showing a method of communication between the data processor 32 and adapter 1 of FIG. 3, according to an embodiment of the present invention.

In step S101, the data processor 32 that is a host to the FDD 31 reads data in a sector 1 of a track 00 transmitted to the FDD 31 from the adapter 1 through the heads 52 and 51.

In step S102, the adapter 1 employs the sector 1 to send recognition data to the data processor 32 through the FDD 31, to inform the data processor 32 that data transfer is made from the adapter 1.

In step S103, the data processor 32 reads the data in the sector 1 and determines whether the cartridge in the FDD 31 is the adapter 1 or an FPD cartridge. If the data in the sector 1 indicates that it is the adapter 1, the flow goes to step S104, and if not, a standard FPD process is carried out.

In step S104, the data processor 32 employs only the track 00 to write and read data (claim 1).

In step S105, the data processor 32 writes a command in the sector 3 of the track 00 and sends it to the adapter 1 through the FDD 31. In step S106, the adapter 1 reads the command in the sector 3 of the track 00.

In step S107, the adapter 1 carries out an operation such as an access operation to the IC card 2b according to the command.

In step S108, the adapter 1 writes a response in the sector 2 of the track 00 and sends it to the data processor 32 through the FDD 31.

In this way, this embodiment uses only the sectors 1 to 3 of the track 00, to transfer data between the adapter 1 and the FDD 31 (claim 1 to 5, 17, and 18).

As a result, the head 93 (FIG. 9) of the FDD 31 does not need to move for a seek operation, thereby shortening a data transfer time.

Figure 11:
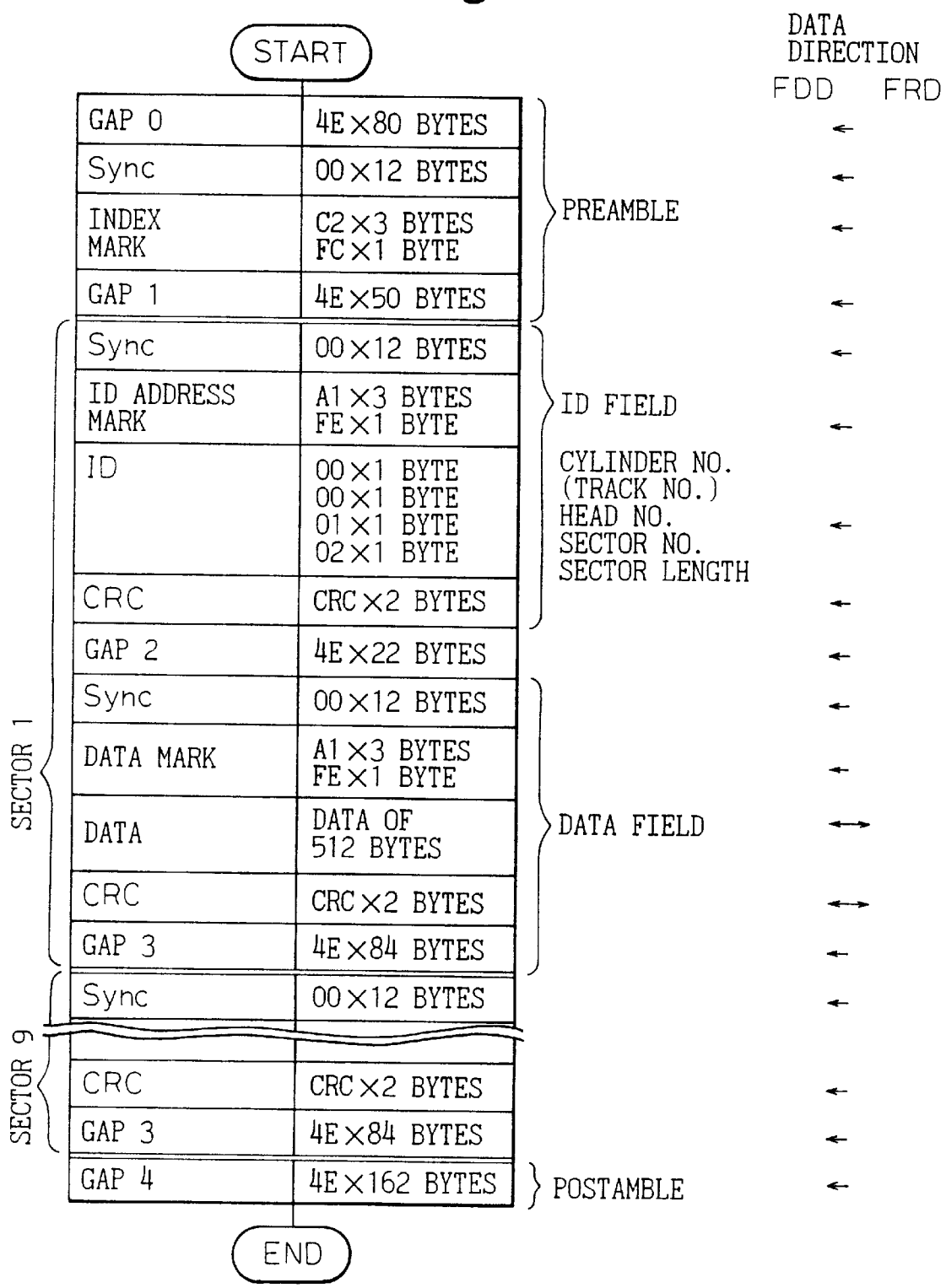
FIG. 11 shows the format of a track of the standard FPD.

FIG. 11 shows the format of a track of the FPD. The track consists of a preamble, sectors 1 to 9, and a postamble. Each of the sectors consists of an ID field and a data field. The preamble has a gap 0 of 80 bytes of fixed data of 4E and a gap 1 of 50 bytes of fixed data of 4E. These gaps 0 and 1 are equal to 2.56 ms and 2.6 ms that are relatively long. The postamble has a gap 4 of 162 bytes of fixed data of 4E and lasts for 5.18 ms that is also long.

A gap 3 is present between adjacent sectors and consists of fixed data of 4E of 84 bytes, which correspond to 2.688 ms.

The adapter 1 of the present invention changes the gaps 0, 1, 3, and 4 according to the status of the controller 72, to shorten an access time (claim 6).

This will be explained with reference to flowcharts of FIGS. 12 to 15.

Figure 12:
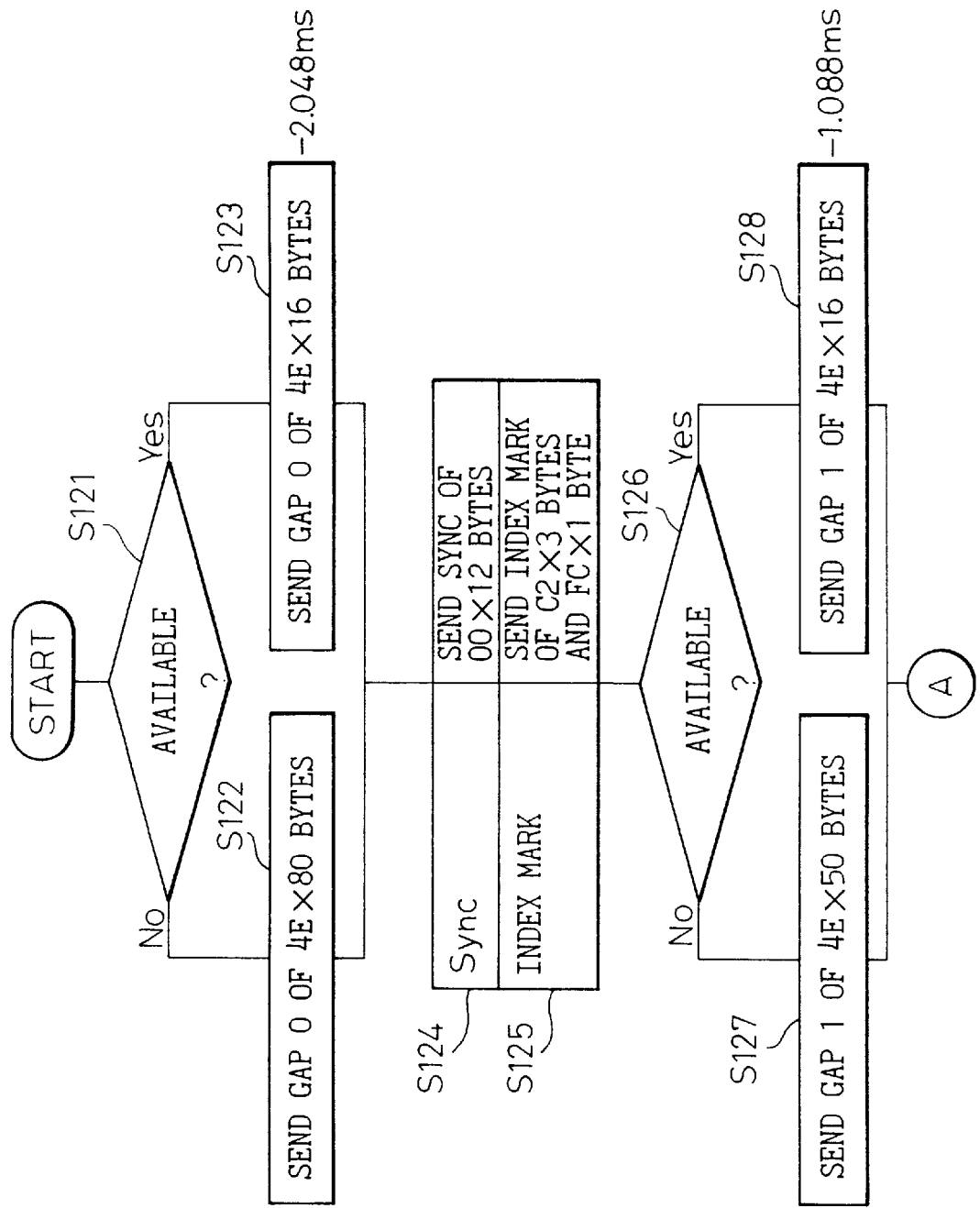
FIGS. 12 to 15 are flowcharts showing the operation of a controller of the adapter of FIG. 7, according to another embodiment of the present invention.

In FIG. 12, step S121 determines whether or not the controller 72 is available. If it is available, the flow goes to step S123, and if not, to step S122. At the start, the controller 72 has no command from the data processor 32, and therefore, no communication with the IC card 2b.

Accordingly, the controller 72 is available to go to step S123. Step S123 shortens the gap 0 to, for example, 16 bytes, to thereby save 2.048 ms. If the controller 72 is unavailable, step S122 sends the gap 0 of 80 bytes like the standard FPD format.

Step S124 sends a synchronous signal of 12 bytes. Step S125 sends an index mark of three plus one bytes. Step S126 again tests if the controller 72 is available. At the start, the controller 72 usually has no communication with the IC card 2b, and therefore, the controller 72 is available to go to step S128. Step S128 shortens the gap 1 to 16 bytes to save 1.088 ms. If the controller 72 is unavailable, step S127 sends the gap 1 of 50 bytes like the standard FPD format.

Figure 13:
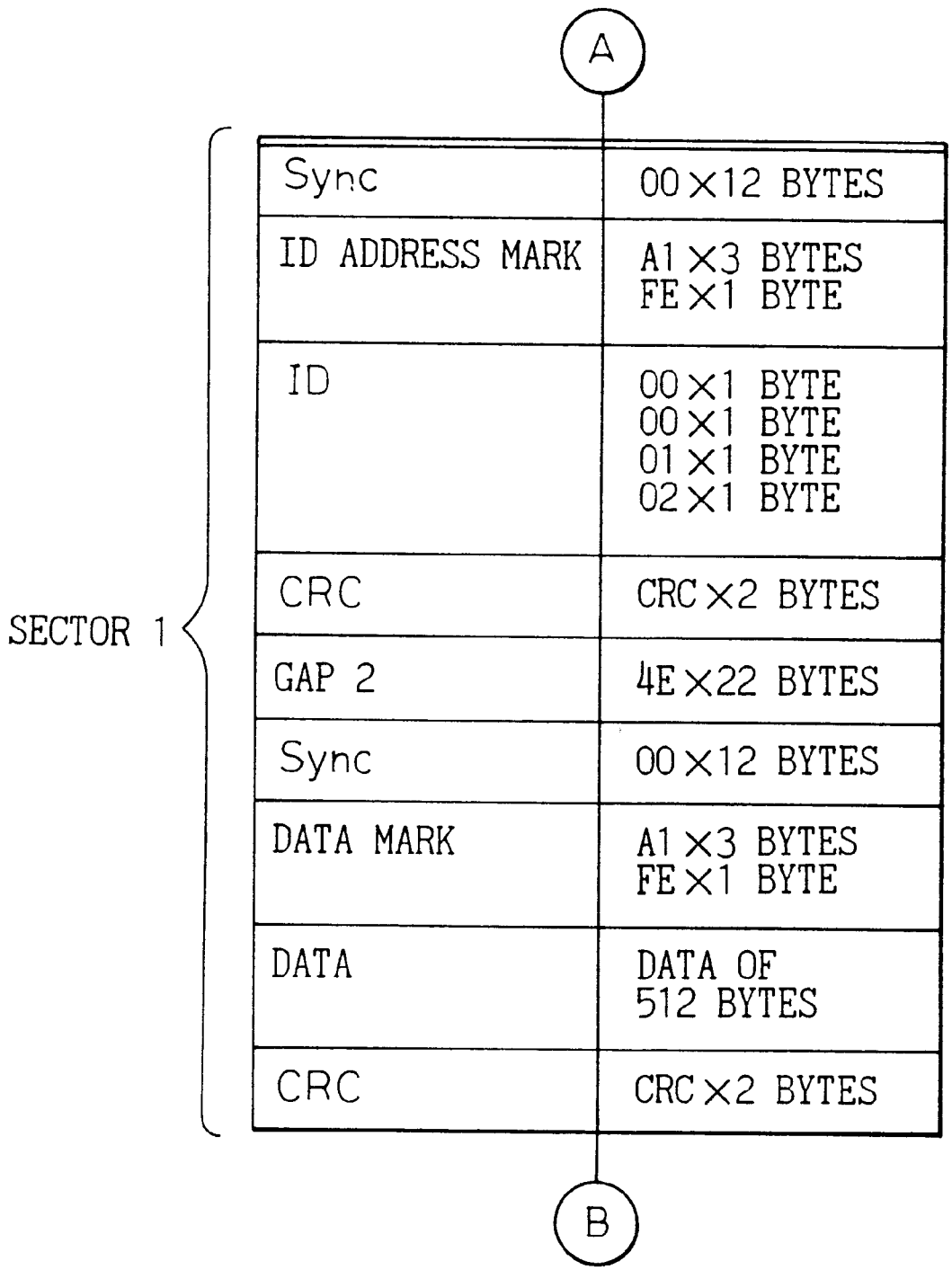

Thereafter, the sector 1 is processed as shown in FIG. 13. This process is similar to that of the standard FPD. Except the gap 3 that follows data transmission, there are no gaps to be shortened. The sector 1 includes synchronous signals, an ID address mark, identification data (ID), cyclic redundancy codes (CRCs), etc.

Figure 14:
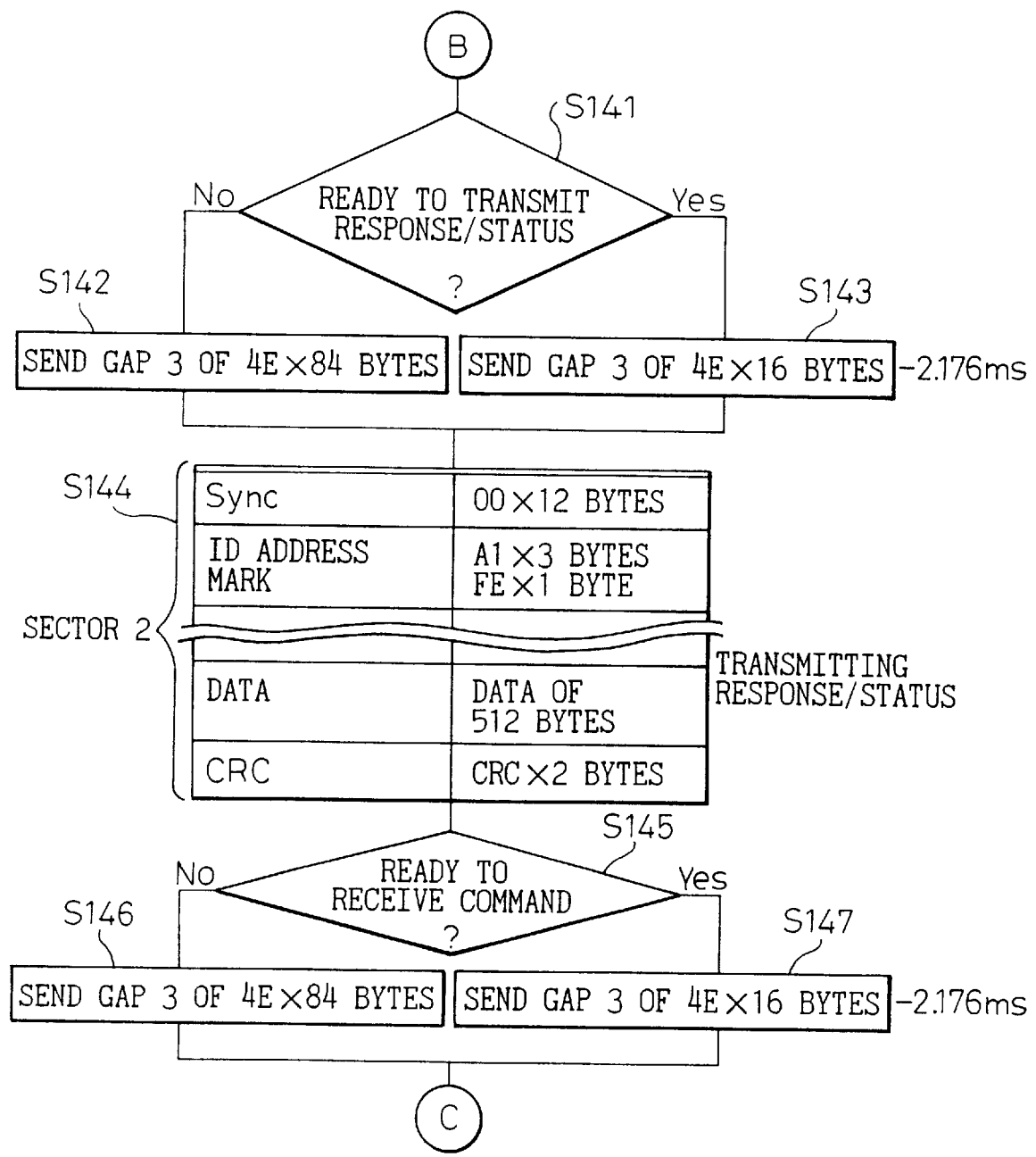

The flowchart of FIG. 14 is then carried out. Step S141 checks to see if the controller 72 is available to send a response or a status to the FDD 31. If the controller 72 has prepared data in the preceding cycle, the controller 72 will be ready to send a response and/or a status to the data processor 32 through the FDD 31 in this cycle. Then, the flow goes to step S143. If the controller 72 has no data to send, the flow goes to step S142. Step S143 shortens the gap 3 of the sector 1 to 16 bytes to save 2.176 ms. Step S142 sends the gap 3 of 84 bytes like the standard FPD format.

In step S144, the adapter 1 transfers a data portion of the sector 2 to the data processor 32 through the FDD 31.

Step s145 checks to see if the controller 72 is available to receive a command from the FDD 31. If the controller 72 has no operation to carry out, the flow goes to step S147, and if not, to step S146. Step S147 shortens the gap 3 of the sector 2 to 16 bytes to save 2.176 ms. Step S146 sends the gap 3 of 84 bytes like the standard FPD format.

Figure 15:
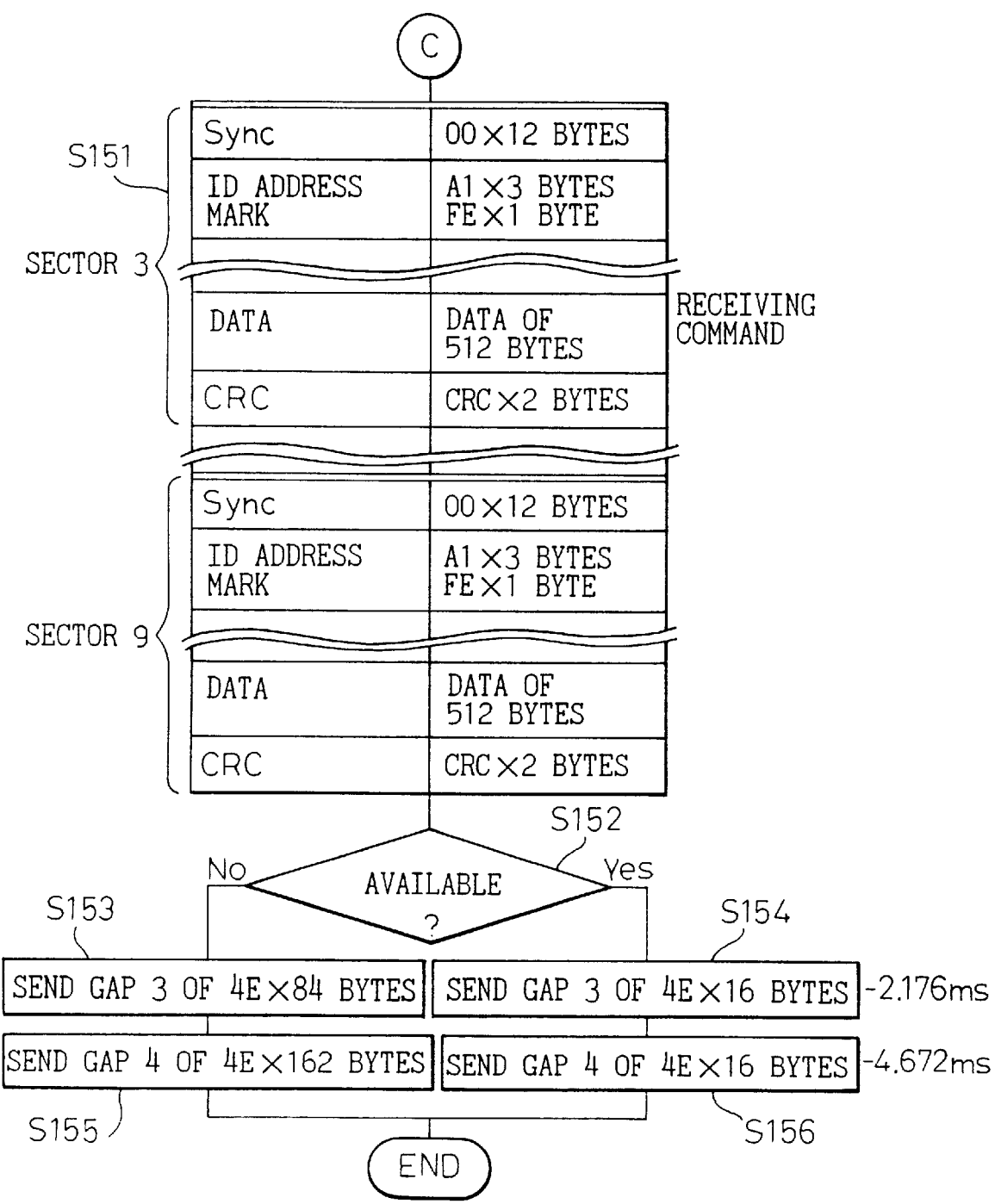

The flowchart of FIG. 15 is carried out. Step S151 processes the sectors 3 to 9 and, if possible, shortens the gaps contained in these sectors, similar to the sectors 1 and 2.

Step S152 again checks to see if the controller 72 is available. If the controller 72 is available, the flow goes to step S154, and if not, to step S153. Step S154 shortens the gap 3 to 16 bytes to save 2.176 ms, and step S156 shortens the gap 4 of the postamble to 16 bytes to save 4.672 ms. Step S153 sends the gap 3 of 84 bytes like the standard FPD format, and step S155 sends the gap 4 of 162 bytes like the standard FPD format.

If no shortening is made on the gaps 0, 1, 3, and 4, the duration of the track is 200 ms like the standard FPD format. If shortening is made on every one of the gaps 0, 1, 3, and 4, the duration of the track is shortened by 27.428 ms.

Figure 16:
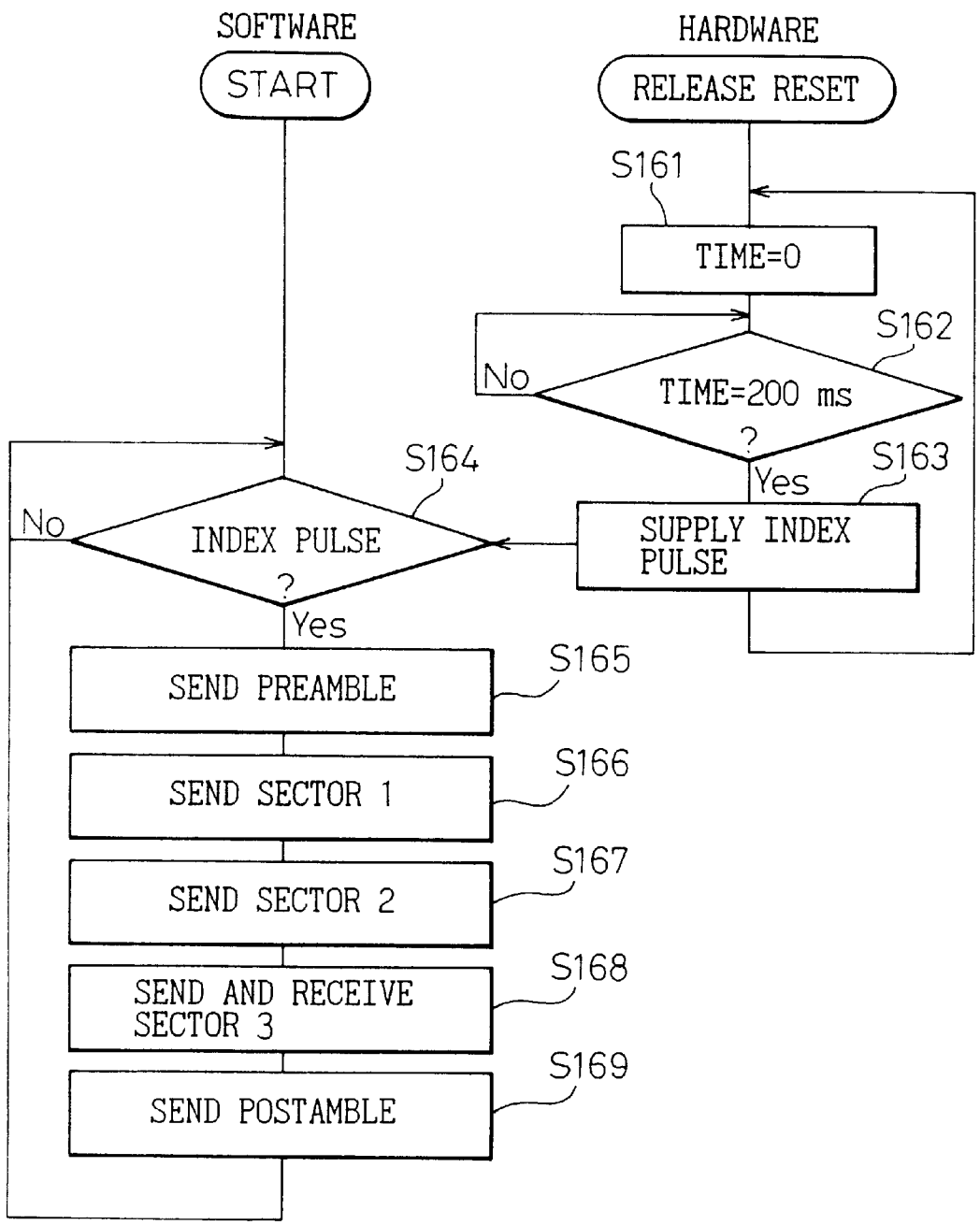
FIG. 16 is a flowchart showing the operation of the adapter of the present invention employing the sectors 1 to 3 of a track 00 without shortening the duration of the track.

FIG. 16 is a flowchart showing the operation of the adapter 1 of the present invention employing the sectors 1 to 3 of the track 00 without shortening the duration of the track. The adapter 1 of the present invention actually needs only the preamble and sectors 1 to 3 of the track 00. Accordingly, the adapter 1 sends gap data of 4E for the sectors 4 to 9 as a postamble, to form the track duration of 200 ms. An index pulse to indicate the start of data transfer is generated by hardware outside the controller 72. Upon detecting the index pulse, software stored in the controller 72 starts to send data from the preamble.

The flowchart of FIG. 16 starts when the hardware is activated. Steps S161 and S162 count 200 ms corresponding to a track duration. After 200 ms, step S163 provides an index pulse to the controller 72. In step S164, the controller 72 detects the index pulse. In step S165, the controller 72 sends a preamble. In step S166, the controller 72 sends recognition data with the sector 1 to the data processor 32 through the FDD 31, to let the data processor 32 recognize that it is the adapter 1. In step S167, the controller 72 sends data with the sector 2 to the data processor 32 through the FDD 31. In step S168, the controller 72 sends an ID for the sector 3 and receives data with the sector 3 from the data processor 32 through the FDD 31. In step S169, the controller 72 sends a postamble to the data processor 32 through the FDD 31 until it detects the next index pulse in step S164. If the controller 72 detects the next index pulse in step S164, it stops the postamble and repeats steps S165 to S169.

In FIG. 16, a track duration is fixed to 200 ms. This duration may be shortened by shortening the intervals to generate the index pulses.

Figure 17:
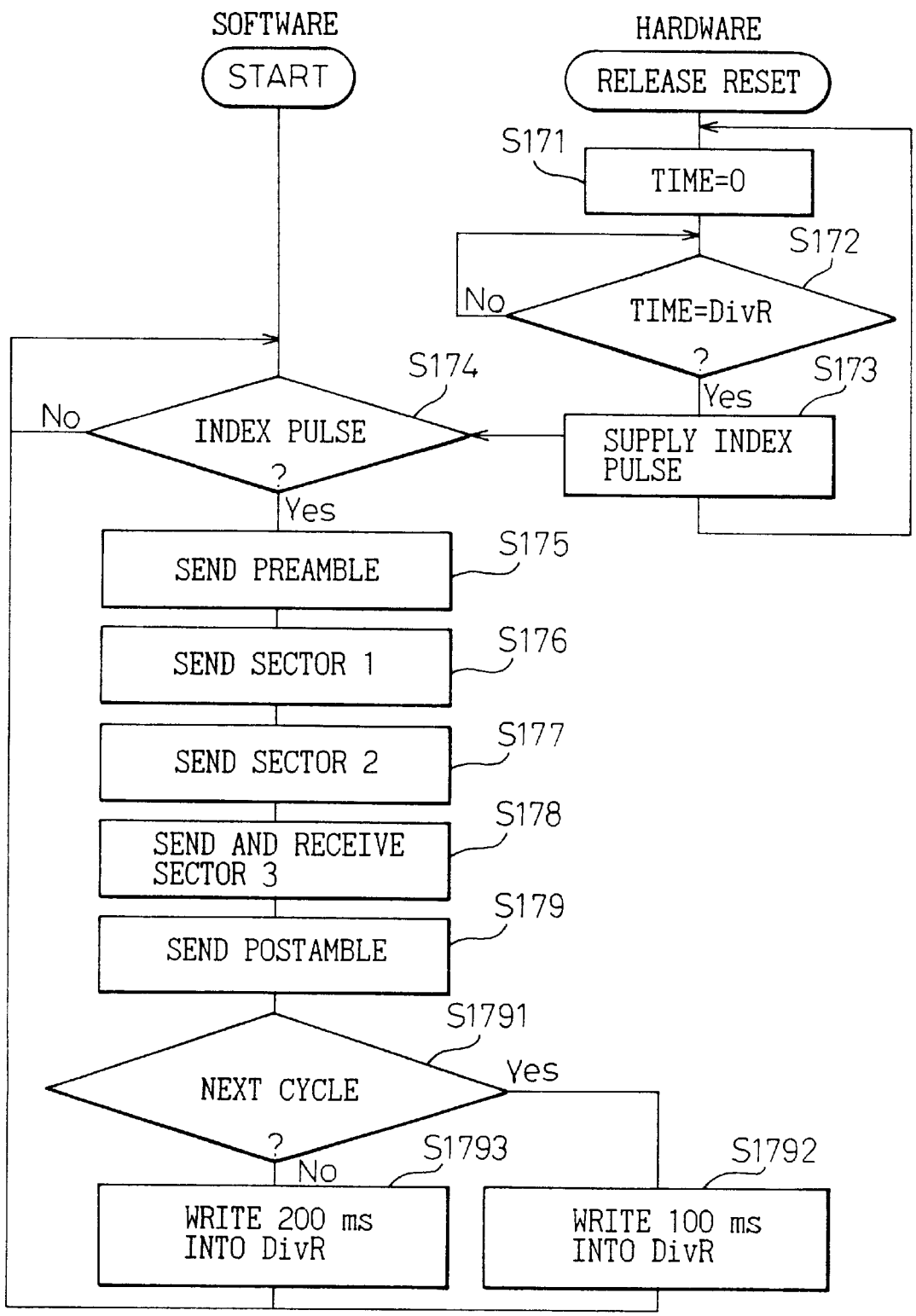
FIG. 17 is a flowchart showing the operation of the adapter to change index pulse generating intervals in response to data transfer conditions, according to still another embodiment of the present invention.

FIG. 17 is a flowchart showing the operation of the adapter 1 to change the intervals of the index pulses in response to data transfer conditions, according to still another embodiment of the present invention (claims 7 and 8). Steps S174 to S179 are the same as steps S164 to S169 of FIG. 16. This embodiment generates an index pulse when a time set in a frequency divider register DivR of the frequency divider 86 (FIG. 8) elapses. Namely, steps S171 and S172 measure the time set in the register DivR, and once the time elapses, an index pulse is supplied to the controller 72.

Upon receiving the index pulse, the controller 72 carries out steps S175 to S179 in the same manner as explained with reference to FIG. 16. Then, step S1791 determines whether or not the next cycle of data transfer can be started. If the adapter 1 carries out no operation, step S1792 sets 100 ms, i.e., half the usual track duration of 200 ms in the register DivR. If the adapter 1 is carrying out some operation to prohibit shortening the track duration, step S1793 sets 200 ms in the register DivR.

The value set in the register DivR is obtained by dividing the reference clock signal by the frequency divider 86 of FIG. 8.

In this way, this embodiment changes a track duration according to data transfer conditions, thereby shortening a data transfer time whenever possible.

Instead of writing a period of time in the register DivR, it is possible to set a value by which the frequency of the reference clock signal is divided.

The shorter time to be written into the register DivR is not limited to 100 ms but it is optional. This time, however, must cover the periods of the preamble, sectors 1 to 3, and postamble. The periods of the preamble and postamble may be changed as explained with reference to FIGS. 12 to 15.

Figure 18:
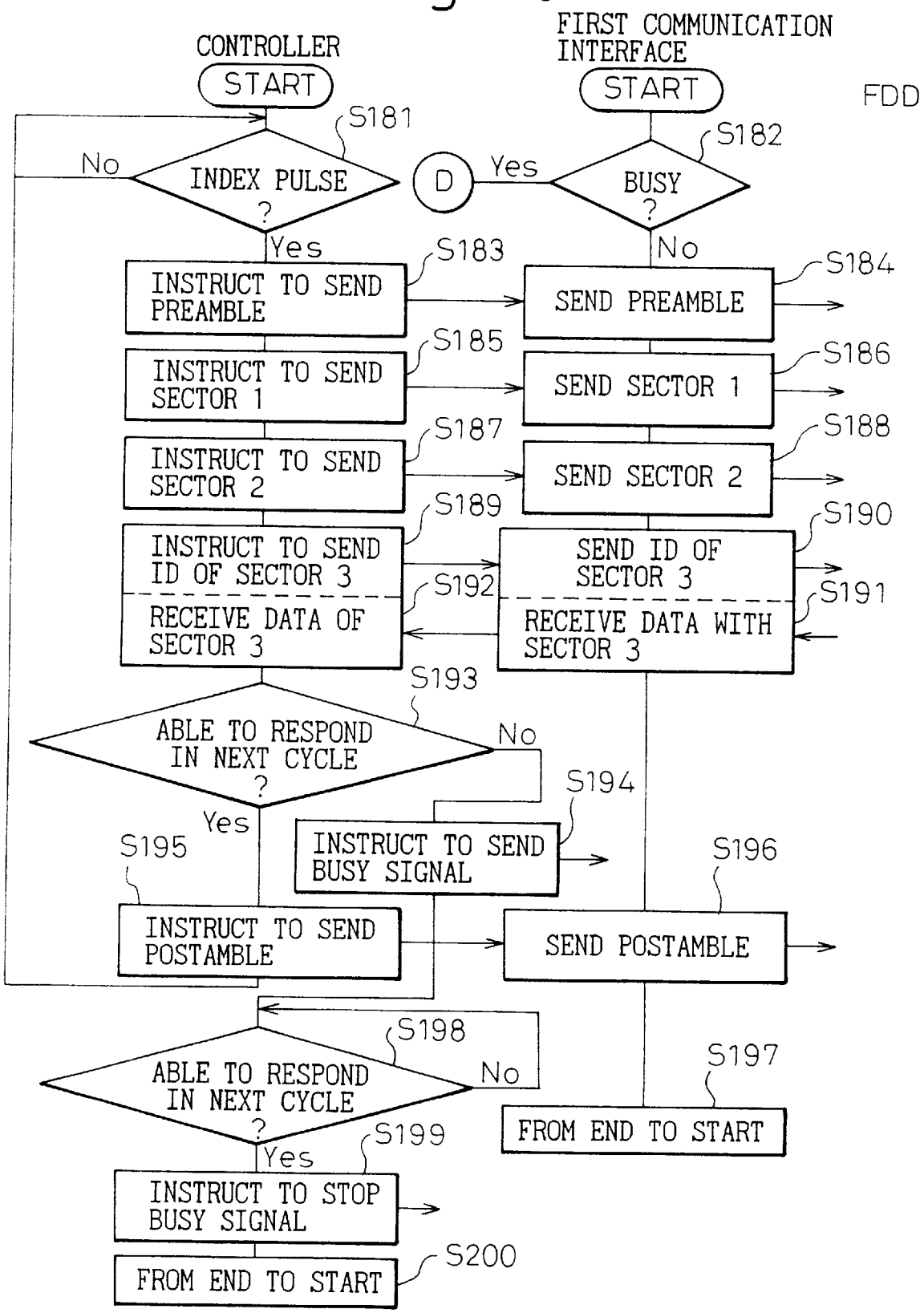
FIG. 18 is a flowchart showing the operation of the adapter of FIG. 7, according to still another embodiment of the present invention.

FIG. 18 is a flowchart showing the operation of the adapter 1 according to still another embodiment of the present invention (claim 9). If the first interface 71 receives no busy signal from the controller 72 and if the software of the controller 72 detects an index pulse in step S181, the controller 72 and first interface 71 carry out steps S183 to S191 to send a preamble and IDs for the sectors 1 to 3 and receive data with the sector 3.

In step S193, the controller 72 determines whether or not a response to a command contained in the data received with the sector 3 is returnable in the next cycle. If the response will not be ready in the next cycle, the controller 72 sends a busy signal to the first interface 71 in step S194. The busy signal lasts until step S198 determines that the response will be ready in the next cycle.

Figure 19:
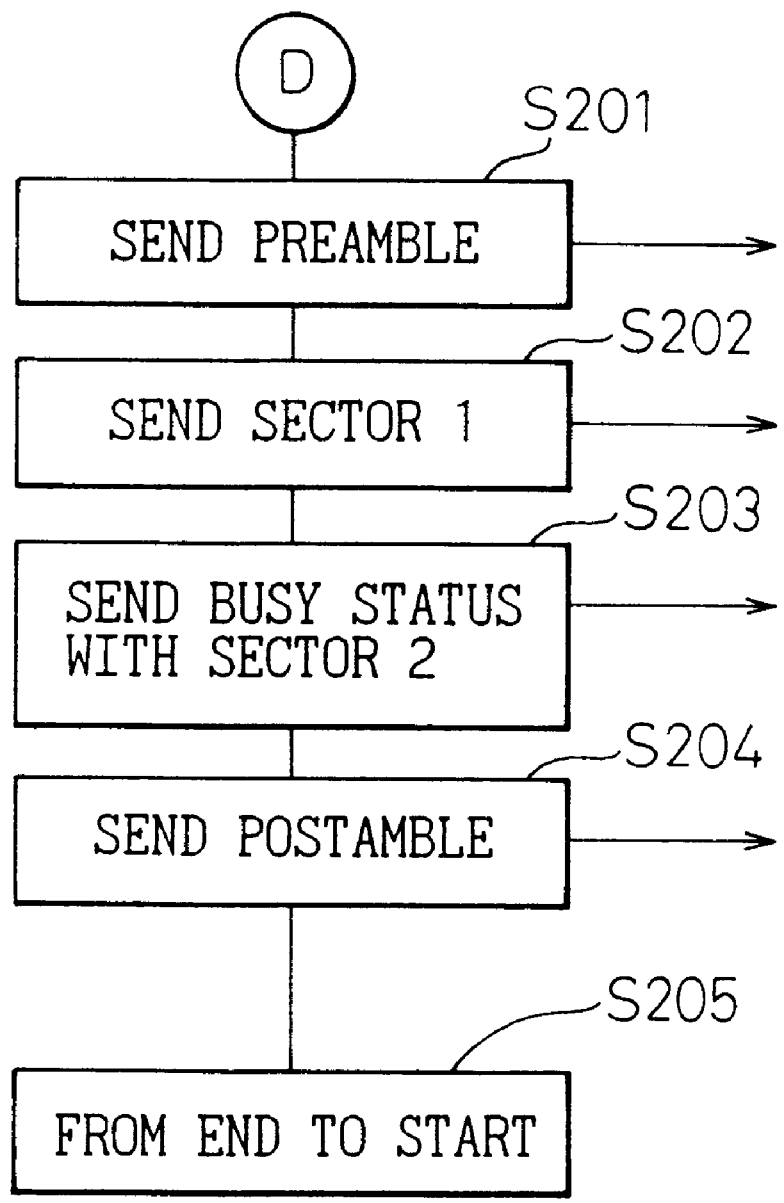
FIG. 19 is a flowchart showing a process of sending preset data to the FDD during the process of FIG. 18.

If the first interface 71 receives a busy signal from the controller 72 in step S182, the first interface 71 sends preset data to the FDD 31 as shown in FIG. 19. Namely, the first interface 71 sends a preamble in step S201, the sector 1 with data for identifying the adapter 1 in step S202, the sector 2 with a busy status in step S203, and a postamble in step S204. The sector 1 may be omitted. The FDD 31 never sends the next command to the adapter 1 before it receives the response.

If it is determined that the response will be ready in the next cycle, the controller 72 stops the busy signal in step S199, and the flow returns to the start.

Upon detecting the next index pulse, the controller 72 resumes data transfer.

In this way, if the controller 72 is unavailable to control the first interface 71, the first interface 71 sends preset data to the FDD 31, and the FDD 31 never sends the next command to the adapter 1. Consequently, the controller 72 is able to exclusively process the present command.

FIG. 20 shows an example of a data structure in the sector 2 according to still another embodiment of the present invention (claim 10). The sector 2 consists of a fixed ID field and a data field. This is the same as the sector 1 of FIG. 11. The adapter 1 of the present invention employs the sector 2 to transfer data to the data processor 32 through the FDD 31. The data in the sector 2 may be a response to a command sent from the data processor 32 to the adapter 1 through the FDD 31 in the preceding cycle. If the controller 72 is communicating with the IC card 2b, a busy status will be written into the sector 2. The ID field of the sector 2 is always fixed. In the data field of the sector 2, a synchronous signal Sync and a data mark are fixed. The length of a data section in the data field of the sector 2 is variable according to data transfer protocols between the data processor 32 and the adapter 1. According to the present invention, the data section consists of a header, a status, data, and a checksum.

When the controller 72 is busy, a busy status is set in the status of the data field of the sector 2. At this time, the header may have a received command, a sequence number, a processing state, etc. The checksum and CRCs are changed accordingly by software.

Figure 21:
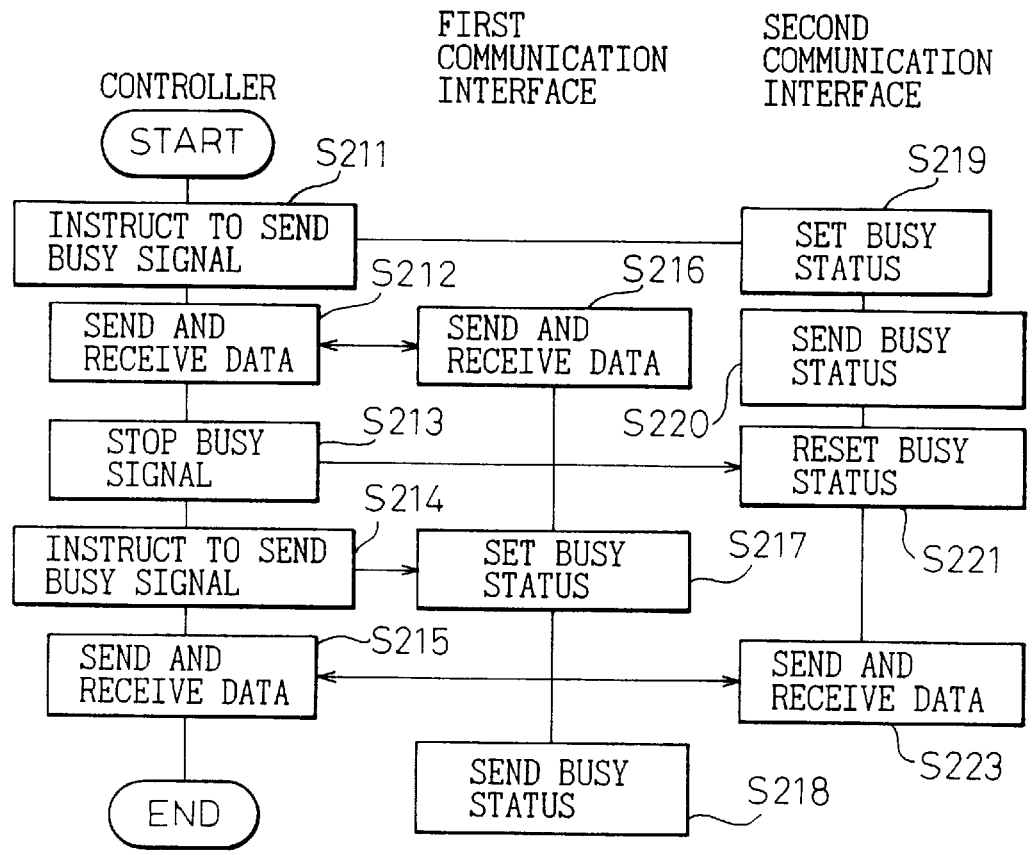
FIG. 21 is a flowchart showing the operations of the adapter of FIG. 7, according to still another embodiment of the present invention.

FIG. 21 is a flowchart showing the operation of the adapter 1, according to still another embodiment of the present invention (claim 11). As explained with reference to FIG. 7, the controller 72 communicates with the first and second interfaces 71 and 73. The first interface 71 is in charge of communication between the controller 72 and the FDD 31. The second interface 73 is in charge of communication between the controller 72 and the IC card 2b. Instead of the IC card 2b, the second interface 73 may communicate with any other recording medium such as a minidisk (MD), an MO, or a DVD.

When the controller 72 exclusively controls the first interface 71, a busy signal is sent to the second interface 73. In response to the busy signal, the second interface 73 sends preset data to indicate a busy status. The recording medium connected to the second interface 73 communicates with the controller 72 in response to a command from the adapter 1. Accordingly, communication between the recording medium and the controller 72 is not necessarily continuous. The IC card 2b, therefore, does not send a busy signal. This embodiment will be explained with reference to the flowchart of FIG. 21.

In step S211, the controller 72 issues a busy signal to the second interface 73. In step S219, the second interface 73 sets a busy status. In step S220, the second interface 73 sends a busy status, which is preset data, to the controller 72. While the busy status is present, the controller 72 sends no command to the IC card 2b. After sending the busy signal to the second interface 73, the controller 72 starts to communicate with the first interface 71.

Upon completion of the communication with the first interface 71, the controller 72 stops the busy signal in step S213. Then, the second interface 73 resets the busy status in step S221.

To exclusively carry out communication with the second interface 73, the controller 72 issues a busy signal to the first interface 71 in step S214. Then, the first interface 71 sets a busy status in step S217. In steps S215 and S223, the controller 72 carries out data transfer with the second interface 73. During this period, the first interface 71 continuously sends a busy status, which is preset data, to the FDD 31. The data processor 32 receives this busy status through the FDD 31, recognizes that the first interface 71 is busy, and issues no command to the adapter 1 during the period.

Figure 22:
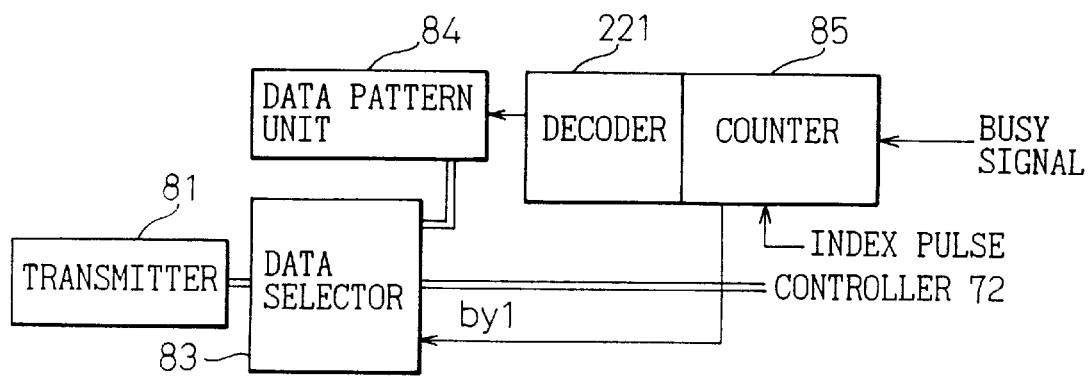
FIG. 22 is a block diagram showing the structure of the first communication interface, according to still another embodiment of the present invention.
Figure 23:
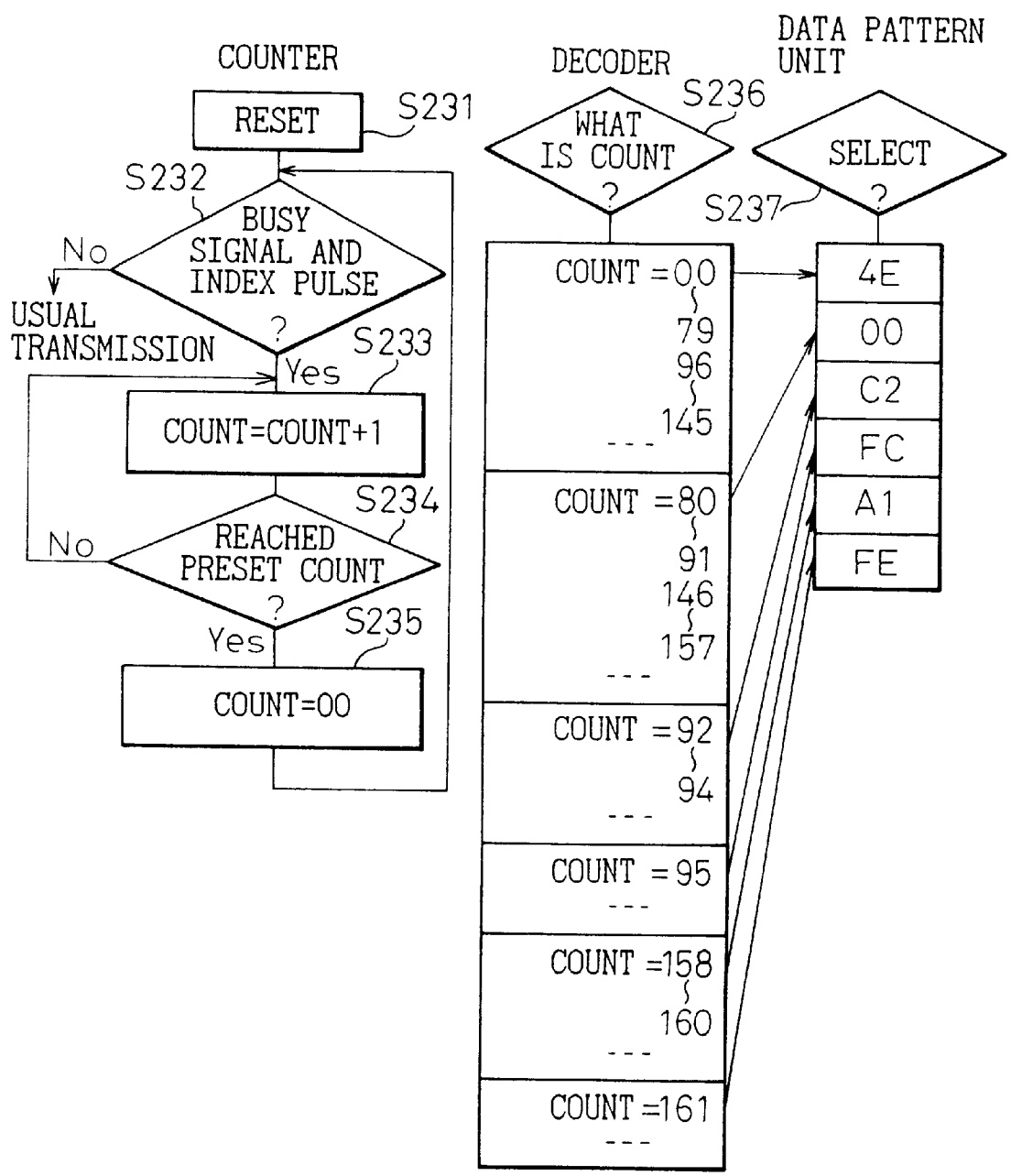
FIG. 23 is a flowchart showing the operation of the first communication interface of FIG. 22 and relationships between the contents of a decoder and data patterns.

FIGS. 22 and 23 show the operation of the first communication interface 71, according to still another embodiment of the present invention (claim 12), in which FIG. 22 is based on FIG. 8 and shows the first interface 71 according to this embodiment. The counter 85 receives an index pulse from the frequency divider 86 and a busy signal from the controller 72. After receiving the busy signal, the counter 85 starts to operate in response to the next index pulse and enables a busy signal by1. A decoder 221 specifies an address in the data pattern unit 84 according to the count of the counter 85. The data pattern unit 84 stores data patterns and corresponding addresses. In response to an address provided by the decoder 221, the data pattern unit 84 provides data to the data selector 83.

If the busy signal by1 is disabled, the data selector 83 selects data from the controller 72 and supplies it to the transmitter 81. If the busy signal by1 is enabled, the data selector 83 selects data from the data pattern unit 84 and supplies it to the transmitter 81.

The data pattern unit 84 may be a hard-wired memory such as a ROM, or a RAM. The contents of the data pattern unit 84 are programmable according to instructions from the controller 72. The data pattern unit 84 may be a register whose data is partly or wholly programmable according to instructions from the controller 72.

Once the controller 72 becomes ready to control the first interface 71, the busy signal by1 is disabled, and in response to the next index pulse, the controller 72 resumes its operation.

Then, the counter 85 and the addressing of the data pattern unit 84 are stopped. When the busy signal by1 is disabled, the data selector 83 selects data from the controller 72 and sends it to the transmitter 81.

The frequency divider 86 for generating index pulses is accessible from the controller 72 to change the frequency dividing ratio thereof.

It is possible, therefore, to vary a track duration, to optimize the performance of the adapter 1 according to data transfer conditions.

FIG. 23 shows the operation of the counter 85 and relations between the decoder 221 and the data pattern unit 84. In step S231, the counter 85 is reset. In step S232, the counter 85 receives a busy signal from the controller 72 and an index pulse. In step S233, the counter 85 starts to count index pulses in response to the next index pulse. When the counter 85 counts index pulses up to a predetermined number, it is reset.

If there is no busy signal in step S232, data from the controller 72 is transferred to the transmitter 81.

Step S236 checks the count of the counter 85. In step S237, the decoder 221 specifies an address of the data pattern unit 84 according to the count of the counter 85. In FIG. 23, the decoder 221 specifies data of 4E if the count is in the range of 00 to 79, or 96 to 145, and data of 00 if the count is in the range of 80 to 91, or 146 to 157.

Figure 24:
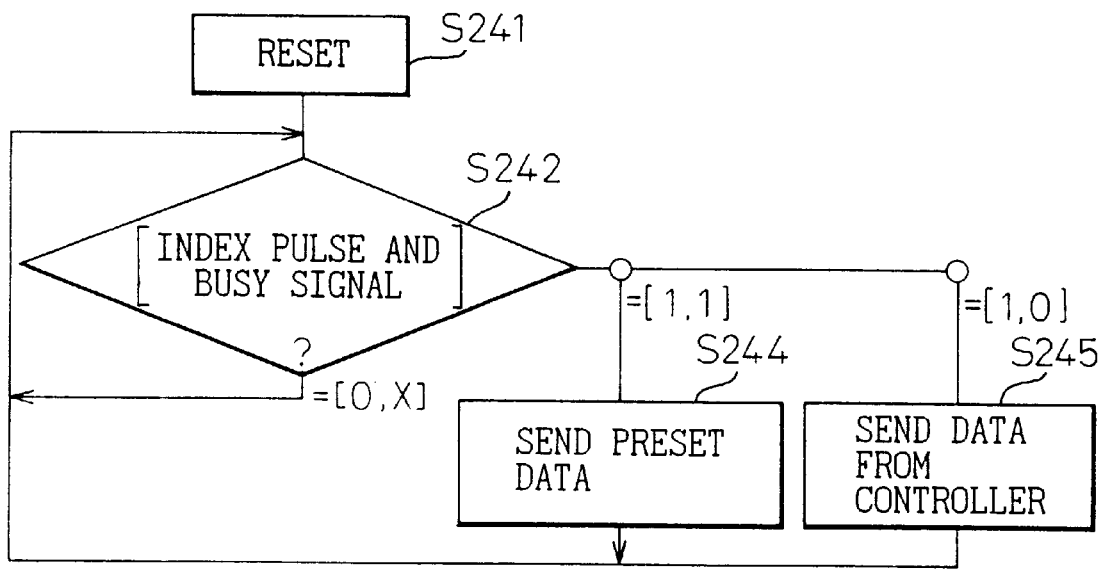
FIGS. 24 and 25 are flowcharts showing the operation of the first communication interface, according to still another embodiment of the present invention.
Figure 25:
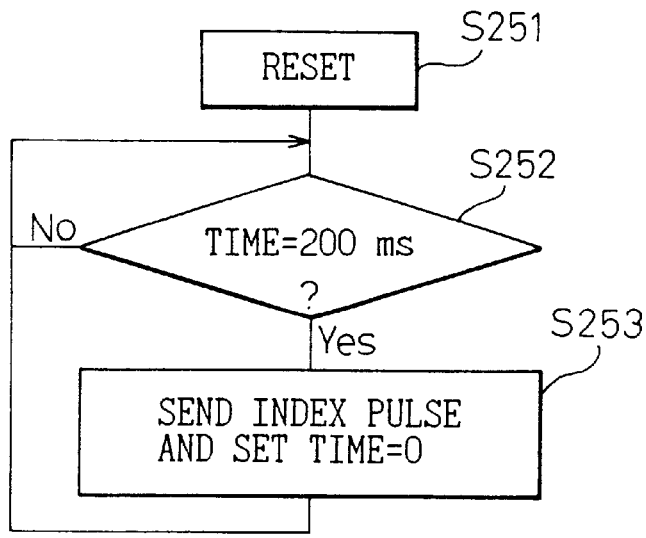

FIGS. 24 and 25 are flowcharts showing the operation of the first communication interface 71, according to still another embodiment of the present invention (claim 13). Steps S251 to S253 of FIG. 25 generates index pulses at regular intervals of 200 ms. In step S242 of FIG. 24, the counter 85 detects an index pulse and a busy signal. If both the index pulse and busy signal are detected, step S244 transmits preset data sent from the data pattern unit 84. If only the index pulse is detected, step S245 transmits data sent from the controller 72.

In this way, preset data from the data pattern unit 84 and data from the controller 72 are switched as and when required in each cycle.

Figure 26:
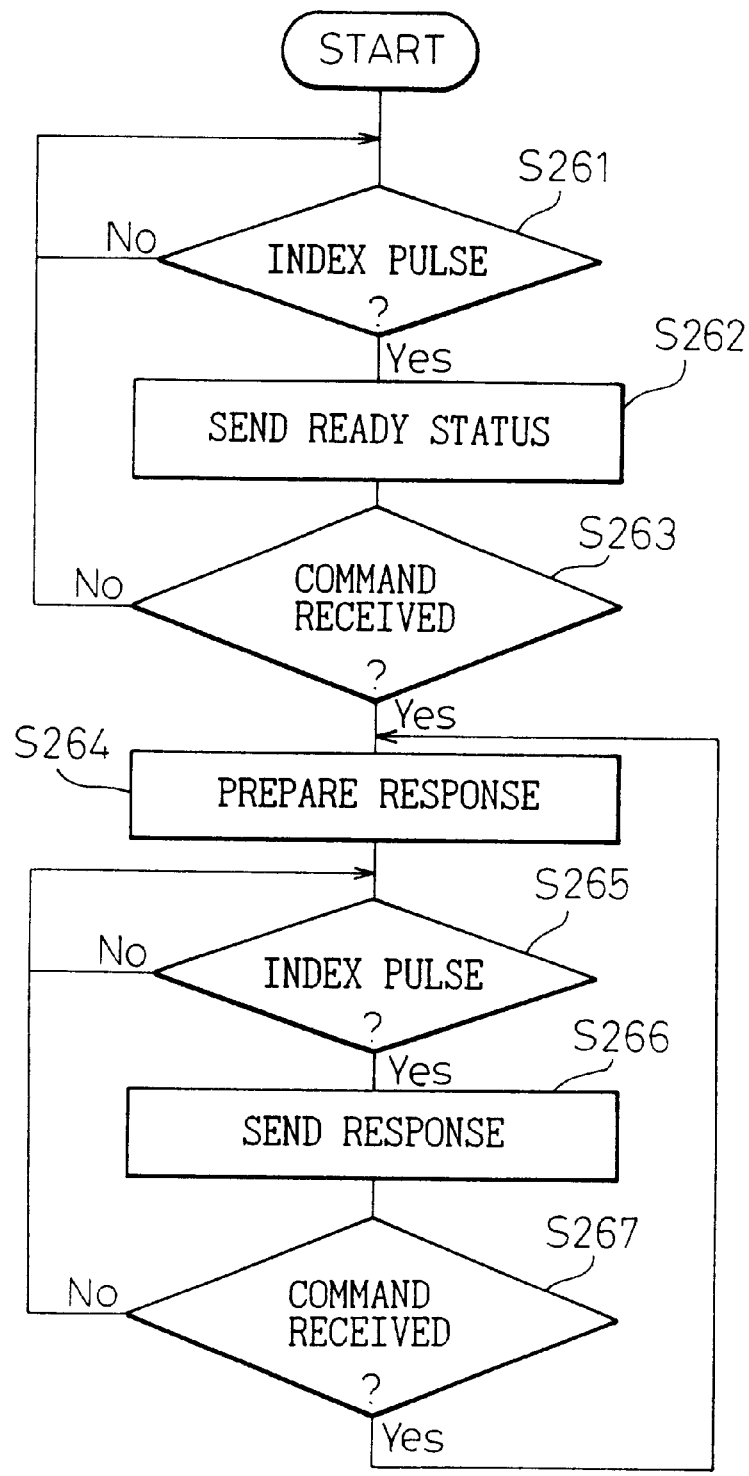
FIG. 26 is a flowchart showing the operation of the controller of the adapter, according to still another embodiment of the present invention.

FIG. 26 is a flowchart showing the operation of the controller 72, according to still another embodiment of the present invention (claim 14). In step S261, the controller 72 detects an index pulse. In step S262, the controller 72 sends a ready status signal. In step S263, the controller 72 determines whether or not there is a command from the FDD 31. If there is no command, the controller 72 continuously issues the ready status signal.

Upon receiving a command from the FDD 31, the controller 72 prepares a response to the command in step S264. If the next index pulse is received in step S265, the controller 72 sends the response to the FDD 31 in step S266. In step S267, the controller 72 checks to see if there is a next command. Steps S265 and 266 are repeated until the next command is received. If the next command comes, the controller 72 prepares a response to it in step S264, and steps S265 to S267 are repeated.

According to this embodiment, the adapter 1 sends the ready status signal periodically until it receives a command from the FDD 31. Upon receiving a command, the adapter 1 prepares a response to it and transmits it in response to an index pulse. The adapter 1 continuously transmits the same response until it receives the next command. Upon receiving a new command, the adapter 1 prepares a response to it and transmits the response upon receiving an index pulse.

Figure 27:
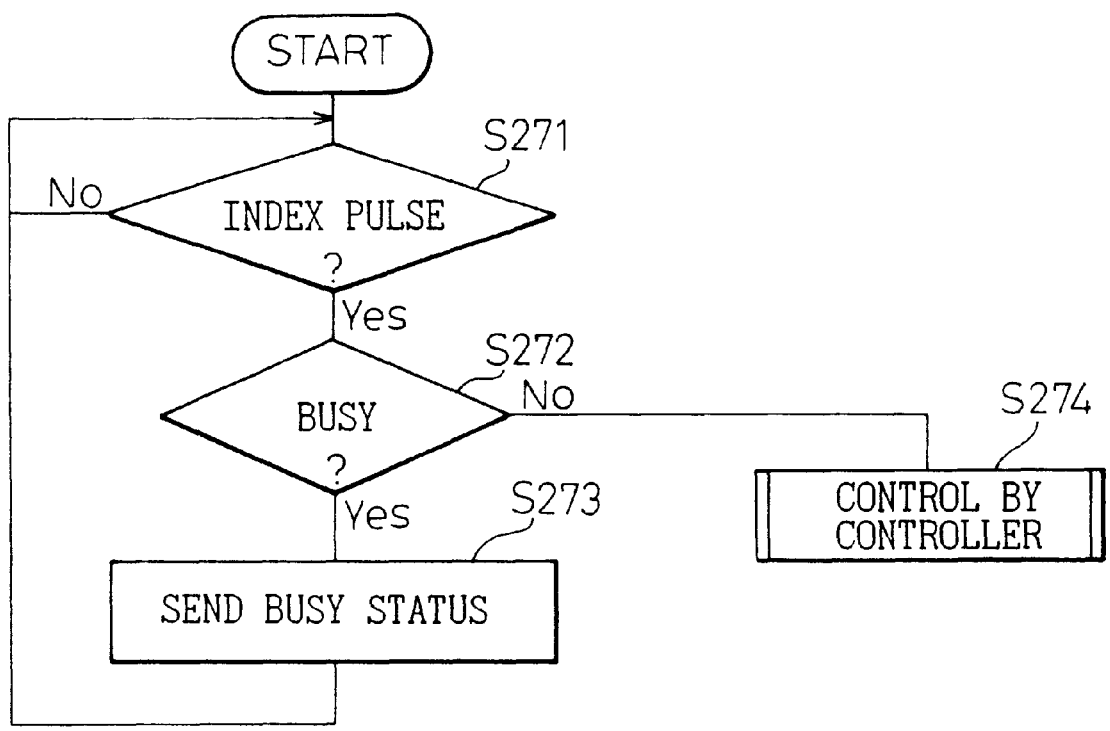
FIG. 27 is a flowchart showing the operation of the controller of the adapter, according to still another embodiment of the present invention.

FIG. 27 is a flowchart showing the operation of the controller 72, according to still another embodiment of the present invention (claim 15). If the controller 72 detects an index pulse in step S271, it checks to see if there is a busy signal in step S272. If there is the busy signal, the controller 72 sends a busy status signal in step S273, and if there is no busy signal, the controller 72 carries out its own control in step S274.

According to this embodiment, the controller 72 tries to detect an index pulse, and if there is a busy signal, it continuously sends a busy status signal until the busy signal is released.

Figure 28:
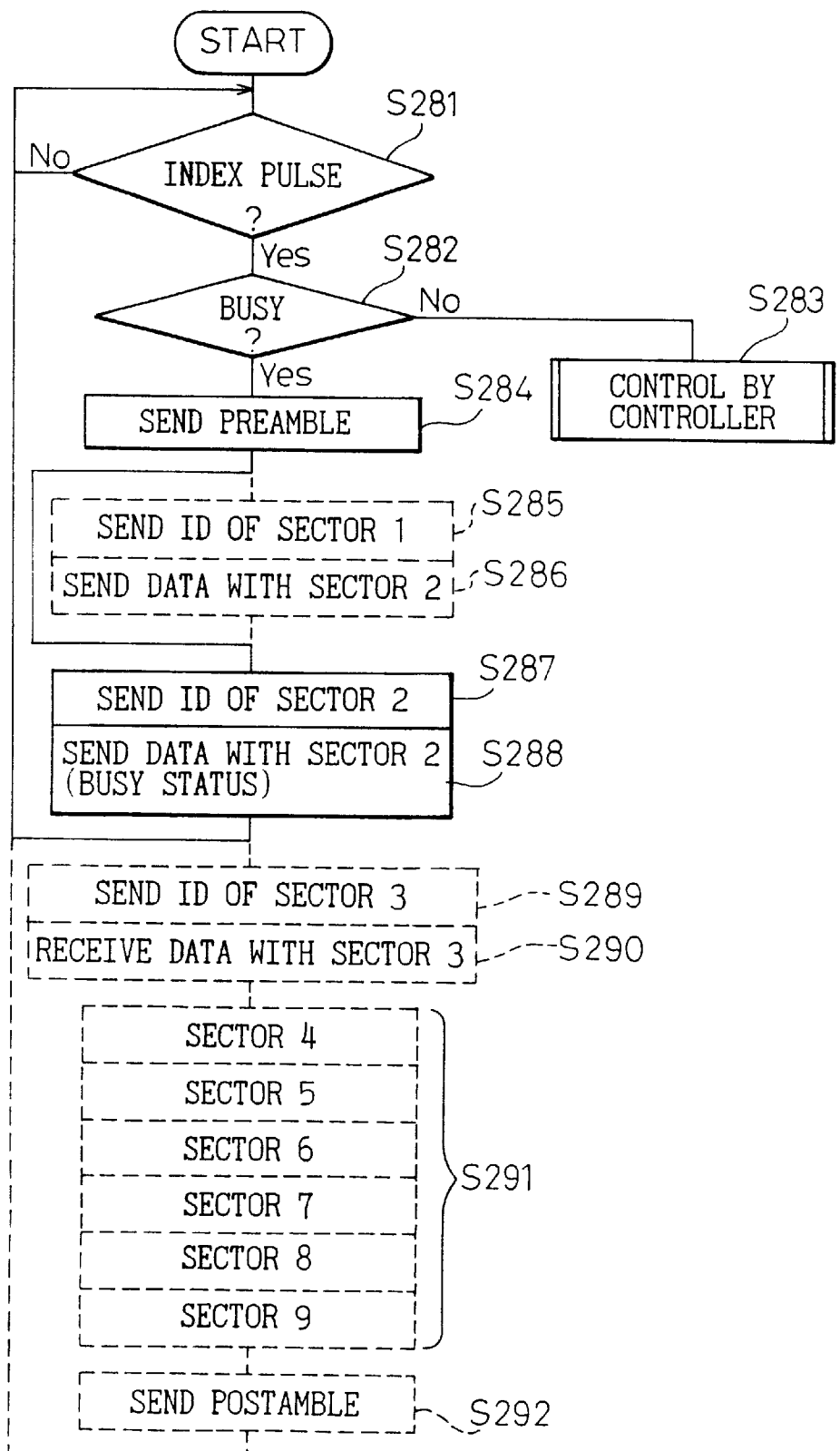
FIG. 28 is a flowchart showing the operation of the controller of the adapter, according to still another embodiment of the present invention.

FIG. 28 is a flowchart showing the operation of the controller 72, according to still another embodiment of the present invention (claim 16). If the controller 72 is busy, the adapter 1 transmits a preamble, writes a busy status in the sector 2, sends the sector 2 to the FDD 31, bypasses the sectors 3 to 9 and postamble, and waits for an index pulse.

Namely, the controller 72 receives an index pulse in step S281, receives a busy signal in step S282, and sends a preamble in step S284. Then, the controller 72 bypasses step S285 for sending the ID of the sector 1 and step S286 for sending data of the sector 2. The controller 72 sends the ID of the sector 2 in step S287 and sends a busy status with the sector 2 to the FDD 31 in step S288. The controller 72 bypasses steps S289 to S292 for sending the sectors 3 to 9 and postamble. Then, the controller 72 waits for an index pulse in step S281.

This embodiment only sends necessary data, to reduce an intervals between adjacent index pulses to a period for covering a preamble and the sector 2, thereby improving data transfer efficacy.

In the above embodiments, the disk cartridge drive is a floppy disk drive (FDD), and the adapter has the same shape as an FPD cartridge and is capable of receiving an IC card. The present invention is not limited to them. The present invention is applicable to any disk cartridge drive and any adapter that incorporates a semiconductor memory.

As explained above, the present invention improves the data processing efficiency of a disk-cartridge-type adapter and data transfer efficiency between the adapter and a disk cartridge drive.

What is claimed is:

1. An adapter shaped to be inserted into a slot of a disk cartridge drive that is designed to receive a disk cartridge containing a disk, comprising:

a controller for controlling data transfer between the adapter and the disk cartridge drive, the controller formatting data to be sent to the disk cartridge drive so that the formatted data may fit into at least part of a disk format having tracks and sectors handled by the disk cartridge drive, and assigning a specific one of the tracks to the formatted data.

2. The adapter of claim 1, wherein the controller assigns a specific one of the sectors to the formatted data.

3. The adapter of claim 2, wherein the controller assigns a specific one of the sectors to data that informs the disk cartridge drive of an access from the adapter.

4. The adapter of claim 2, wherein the controller assigns a specific one of the sectors to data to be transferred from the adapter to the disk cartridge drive.

5. The adapter of claim 2, wherein the controller assigns a specific one of the sectors to data transferred from the disk cartridge drive to the adapter.

6. The adapter of claim 2, wherein the controller changes the duration of a gap between adjacent sectors according to data transfer conditions.

7. The adapter of claim 1, wherein the controller changes the duration of the specific track according to data transfer conditions.

8. The adapter of claim 7, wherein the controller changes the duration of the specific track by changing the frequency dividing ratio of a reference clock signal.

9. A method of transferring data between an adapter and a disk cartridge drive through heads of the adapter and disk cartridge drive, the disk cartridge drive having a slot to receive a disk cartridge containing a disk, the adapter being shaped to be inserted into the slot of the disk cartridge drive, the data being formatted so that the formatted data may fit into at least part of a disk format having tracks and sectors handled by the disk cartridge drive, comprising the steps of:

fixing the position of the head of the disk cartridge drive to face the head of the adapter;

assigning a specific one of the tracks to data to be transferred between the adapter and the disk cartridge drive; and transferring the data with the specific track between the heads of the adapter and disk cartridge drive.

10. The method of claim 9, comprising the steps of:

assigning a specific one of the sectors to data to be transferred between the adapter and the disk cartridge drive; and transferring the data with the specific sector between the heads of the adapter and disk cartridge drive.

* * * * *